(12) United States Patent
Yokoyama et al.

(10) Patent No.: US 8,839,894 B2
(45) Date of Patent: Sep. 23, 2014

(54) ELECTRIC DRIVE SYSTEM FOR VEHICLE

(75) Inventors: Atsushi Yokoyama, Hitachiota (JP);
Masatsugu Arai, Kasumigaura (JP);
Tadashi Osaka, Kashiwa (JP); Itsuro Sawada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 172 days.

(21) Appl. No.: 13/577,196

(22) PCT Filed: Aug. 25, 2010

(86) PCT No.: PCT/JP2010/064392
§ 371 (c)(1),
(2), (4) Date: Oct. 30, 2012

(87) PCT Pub. No.: WO2011/096102
PCT Pub. Date: Aug. 11, 2011

(65) Prior Publication Data
US 2013/0118820 A1 May 16, 2013

(30) Foreign Application Priority Data

Feb. 5, 2010 (JP) ................................ 2010-023917

(51) Int. Cl.
| | | |
|---|---|---|
| *B60K 11/02* | (2006.01) | |
| *B60H 1/00* | (2006.01) | |
| *B60L 11/18* | (2006.01) | |
| *B60H 1/08* | (2006.01) | |
| *B60K 1/00* | (2006.01) | |

(52) U.S. Cl.
CPC ............ *B60K 11/02* (2013.01); *B60H 1/00385* (2013.01); *B60K 2001/005* (2013.01); *B60L 11/1874* (2013.01); *B60H 1/08* (2013.01); *Y02T 10/705* (2013.01); *B60L 11/1892* (2013.01); *B60K 2001/003* (2013.01); *Y02T 90/34* (2013.01); *B60K 1/00* (2013.01)
USPC .......................................... 180/68.4; 180/299

(58) Field of Classification Search
CPC ............................... B60K 11/02; B60K 11/04
USPC ................................................ 180/68.4, 299
See application file for complete search history.

(56) References Cited

U.S. PATENT DOCUMENTS

| | | | | |
|---|---|---|---|---|
| 5,096,010 A | * | 3/1992 | Ojala et al. | 180/68.3 |
| 6,098,702 A | * | 8/2000 | Shadbourne et al. | 165/69 |

(Continued)

FOREIGN PATENT DOCUMENTS

| | | |
|---|---|---|
| JP | 58-142128 | 9/1983 |
| JP | 2005-504686 A | 2/2005 |

(Continued)

OTHER PUBLICATIONS

PCT International Search Report on application PCT/JP2010/064392 mailed Dec. 7, 2010; 2 pages.

(Continued)

*Primary Examiner* — Jeffrey J Restifo
(74) *Attorney, Agent, or Firm* — Foley & Lardner LLP

(57) ABSTRACT

An electric drive system for a vehicle includes: an electric drive unit that electrically drives the vehicle; and a cooling unit that cools the electric drive unit, wherein: the electric drive unit and the cooling unit are mounted at a body frame of the vehicle via an elastic support member, the electric drive unit and the cooling unit being configured as an integrated unit.

12 Claims, 14 Drawing Sheets

(56) References Cited

U.S. PATENT DOCUMENTS

Figure 1:
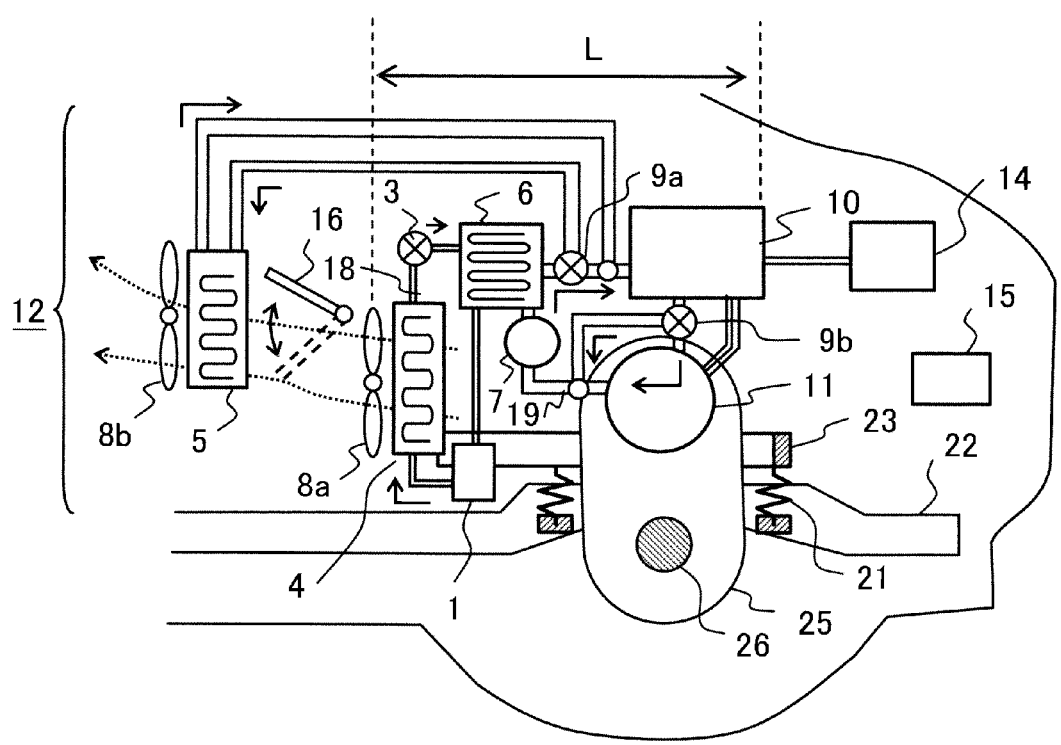

| | | | |
|---|---|---|---|
| 6,443,253 B1* | 9/2002 | Whitehead et al. | 180/68.1 |
| 6,708,790 B2* | 3/2004 | Ozawa et al. | 180/68.4 |
| 6,782,849 B2* | 8/2004 | Roithinger | 123/41.56 |
| 6,994,178 B2* | 2/2006 | Mizuno | 429/430 |
| 7,284,594 B2* | 10/2007 | Sanada et al. | 165/41 |
| 7,395,787 B1* | 7/2008 | Claypole et al. | 123/41.01 |
| 7,748,484 B2* | 7/2010 | Matsushima et al. | 180/68.4 |
| 7,823,671 B2* | 11/2010 | Inoue et al. | 180/68.4 |
| 8,371,406 B2* | 2/2013 | Masaki et al. | 180/65.31 |
| 2005/0061497 A1* | 3/2005 | Amaral et al. | 165/202 |
| 2007/0051549 A1* | 3/2007 | Fukuda | 180/232 |
| 2007/0240923 A1* | 10/2007 | Matsushima et al. | 180/68.4 |
| 2008/0142289 A1* | 6/2008 | Yang et al. | 180/299 |
| 2009/0183936 A1* | 7/2009 | Kim et al. | 180/68.4 |
| 2009/0289583 A1* | 11/2009 | Yoshida | 318/400.01 |
| 2012/0297820 A1* | 11/2012 | Masuda et al. | 62/509 |
| 2013/0118820 A1* | 5/2013 | Yokoyama et al. | 180/65.1 |

FOREIGN PATENT DOCUMENTS

| | | |
|---|---|---|
| JP | 2005-090862 | 4/2005 |
| JP | 2007-166804 A | 6/2007 |
| JP | 2008-105645 | 5/2008 |
| JP | 2009-126256 A | 6/2009 |

OTHER PUBLICATIONS

Japan Patent Office Notification of Reasons for Refusal on application 2010-023917 mailed Jan. 22, 2013; pp. 1-3.

* cited by examiner

FIG.11
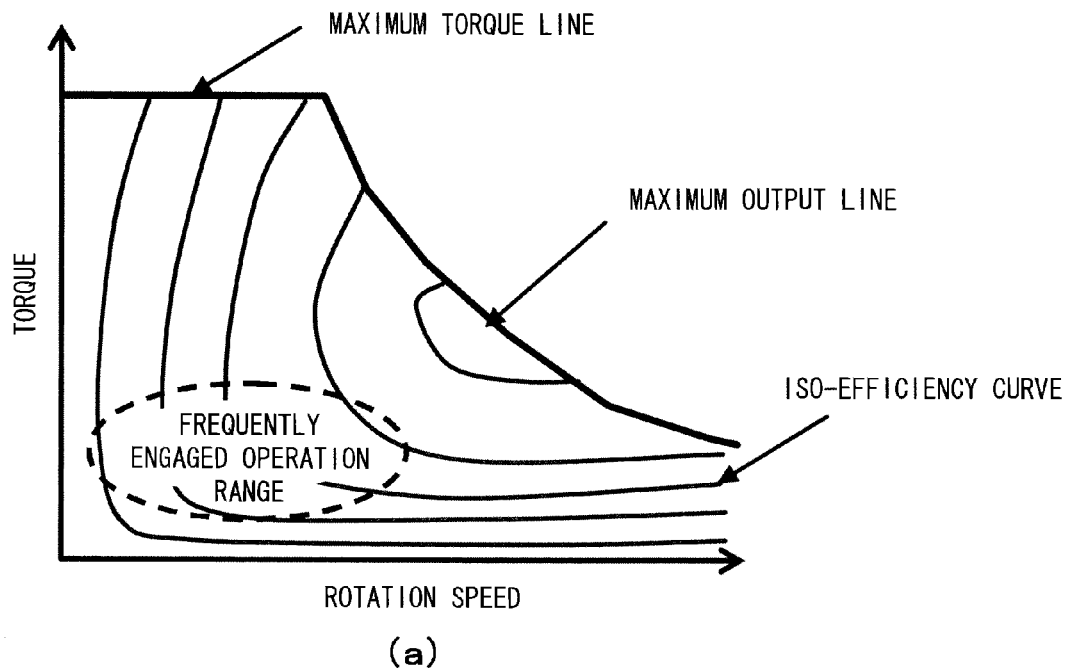
(a)
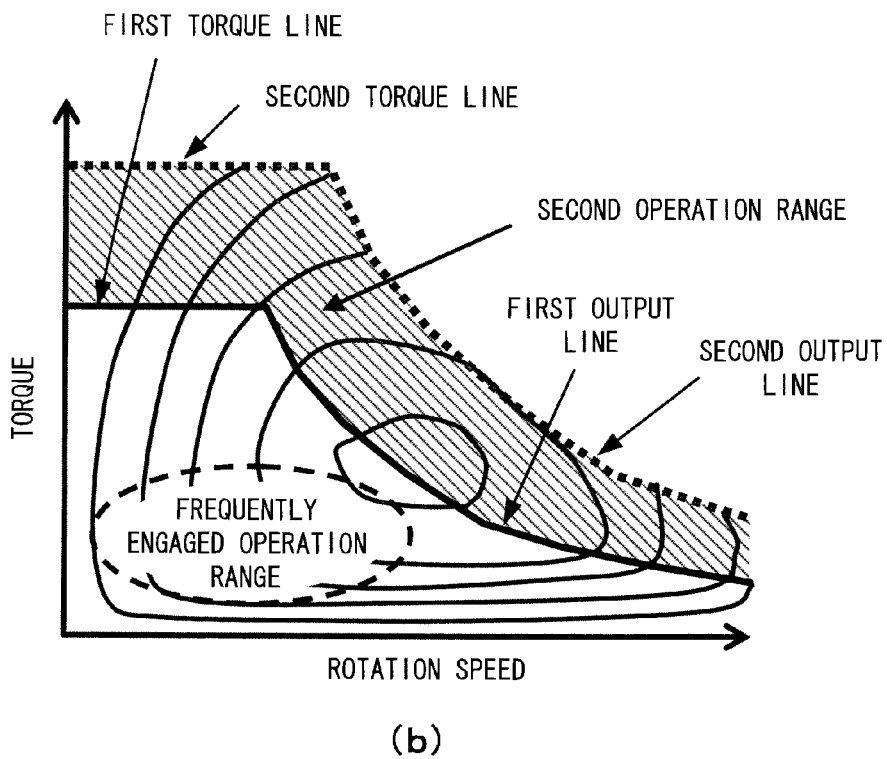
(b)

FIG.12

(a)

|  | FIRST COOLING MODE | SECOND COOLING MODE |
|---|---|---|
| FAN | STEADY OPERATION | MAXIMUM SPEED OPERATION OR OPERATION IN PROPORTION TO MOTOR OUTPUT |
| PUMP | | |

(b)

|  | FIRST COOLING MODE | SECOND COOLING MODE |
|---|---|---|
| FAN | OPERATION IN PROPORTION TO THE MOTOR OUTPUT | MAXIMUM SPEED OPERATION |
| PUMP | | |

(c)

|  | FIRST COOLING MODE | SECOND COOLING MODE |
|---|---|---|
| FAN | STEADY OPERATION | MAXIMUM SPEED OPERATION OR OPERATION IN PROPORTION TO MOTOR OUTPUT |
| PUMP | STEADY OPERATION | |

(d)

|  | FIRST COOLING MODE | SECOND COOLING MODE |
|---|---|---|
| FAN | STEADY OPERATION | |
| PUMP | STEADY OPERATION | MAXIMUM SPEED OPERATION OR OPERATION IN PROPORTION TO MOTOR OUTPUT |

ELECTRIC DRIVE SYSTEM FOR VEHICLE

TECHNICAL FIELD

The present invention relates to an electric drive system for a vehicle.

BACKGROUND ART

In an electric drive system for a vehicle known in the related art, a cooling medium circulation path is formed in an electric drive device that electrically drives the vehicle, a target flow rate for a cooling medium flowing through refrigerant piping is determined based upon an electric motor current command value and a refrigerant circulation pump is driven based upon the target flow rate (see, for instance, patent literature 1). Such a cooling system is considered to assure a high level of responsiveness with which the refrigerant is supplied in a quantity corresponding to the extent of temperature increase occurring as heat is generated at the electric drive device where the electric motor current, i.e., the required drive force, is expected to rise.

CITATION LIST

Patent Literature

Patent literature 1: Japanese Laid Open Patent Publication No. 2007-166804

SUMMARY OF INVENTION

Technical Problem

A standard vehicle drive device cooling system in the related art typically includes an outside heat exchanger (radiator) mounted in the vicinity of a bumper located at the front of the vehicle where the vehicle is likely to be subjected to significant wind pressure as it travels. The outside heat exchanger is connected to the refrigerant piping, located between the outside heat exchanger and the electric motor, by using an elastic pipe such as a rubber hose, so as to ensure that vibration attributable to motor torque is not transmitted to drive components through the outside heat exchanger or the body skeleton (body frame).

However, if the liquid cooling system is configured as described above in conjunction with the vehicle electric drive system in the related art described earlier, the distance between the outside heat exchanger and the electric motor is bound to become longer, and thus, the length of the refrigerant piping will be significant. This means that even as the refrigerant circulation pump is driven in correspondence to the extent of an increase in the target flow rate, it will take a considerable length of time for the cooling medium, having been cooled at the outside heat exchanger, to reach drive devices such as the electric motor and a power converter. In addition, the volume of cooling medium present and the heat content in the cooling medium in the longer refrigerant piping are bound to be greater and, as a result, it will take more time to lower the overall temperature of the cooling medium. A concern thus arises in that a sufficient level of cooling response may not be achieved even if the pump is driven in order to increase the quantity of refrigerant supply in response to, for instance, a sudden accelerator pedal operation by the driver or a sudden change in the traveling load.

Solution to Problem

According to the 1st aspect of the present invention, an electric drive system for a vehicle comprises: an electric drive unit that electrically drives the vehicle; and a cooling unit that cools the electric drive unit, wherein: the electric drive unit and the cooling unit are mounted at a body frame of the vehicle via an elastic support member, the electric drive unit and the cooling unit being configured as an integrated unit.

According to the 2nd aspect of the present invention, it is preferred that in the electric drive system for a vehicle according to the 1st aspect, the cooling unit includes: a refrigerant circulation path through which a cooling medium is circulated to the electric drive unit; a heat exchange unit via which the cooling medium and outside air exchange heat; a refrigerant circulation unit that circulates the cooling medium between the heat exchange unit and the electric drive unit through the refrigerant circulation path; and an air blower unit that blows air to the heat exchange unit, wherein: the electric drive unit, the refrigerant circulation path, the heat exchange unit, the refrigerant circulation unit and the air blower unit are disposed at a sub-frame rather than at the body frame, and the sub-frame is mounted at the body frame via the elastic support member.

According to the 3rd aspect of the present invention, it is preferred that in the electric drive system for a vehicle according to the 2nd aspect, a cooling medium outlet port through which the cooling medium is let out from the heat exchange unit is positioned closer to a cooling medium intake port of the electric drive unit, compared to a cooling medium intake port of the heat exchange unit.

According to the 4th aspect of the present invention, it is preferred that in the electric drive system for a vehicle according to the 2nd or the 3rd aspect, a cooling medium outlet port of the heat exchange unit is set in an area where the outside air passes through the heat exchange unit at a higher flow rate.

According to the 5th aspect of the present invention, the electric drive system for a vehicle according to any one of the 2nd through 4th aspects may further comprise: a flow-regulating plate that prevents the outside air near the electric drive unit from passing through the heat exchange unit.

According to the 6th aspect of the present invention, the electric drive system for a vehicle according to any one of the 2nd through 5th aspects may further comprise: an outside air delivery unit that delivers the outside air having passed through the heat exchange unit into a cabin of the vehicle.

According to the 7th aspect of the present invention, it is preferred that in the electric drive system for a vehicle according to any one of the 2nd through 6th aspects, the heat exchange unit is disposed so that the outside air blown toward the heat exchange unit by the air blower unit passes through both over an upper side and over a lower side of a driveshaft of the vehicle.

According to the 8th aspect of the present invention, it is preferred that in the electric drive system for a vehicle according to any one of the 2nd through 7th aspects, the heat exchange unit includes another refrigerant circulation path different from the refrigerant circulation path and is equipped with a compressor that compresses the cooling medium into the other refrigerant circulation path, a condenser that condenses the cooling medium having flowed out of the compressor by releasing heat thereof into an atmosphere, an expansion valve via which pressure of the cooling medium having flowed out of the condenser is lowered, and an evaporator that absorbs heat from the cooling medium flowing through the refrigerant circulation path by evaporating the cooling medium having flowed out from the expansion valve.

According to the 9th aspect of the present invention, it is preferred that in the electric drive system for a vehicle according to the 8th aspect, a cooling medium outlet port through which cooling medium flows out of the condenser is positioned closer to a cooling medium intake port of the evaporator, compared to a cooling medium intake port of the condenser.

According to the 10th aspect of the present invention, it is preferred that in the electric drive system for a vehicle according to the 8th or claim 9th aspect, the evaporator is disposed at a position at which lengths of the refrigerant circulation path and the other refrigerant circulation path, extending between the condenser and the electric drive unit, are smallest.

According to the 11th aspect of the present invention, it is preferred that in the electric drive system for a vehicle according to any one of the 1st through 10th aspects, the electric drive unit includes an electric motor that drives the vehicle to engage the vehicle in traveling operation and a power converter that drives the electric motor, with the power converter disposed on an upstream side of the refrigerant circulation path and the electric motor disposed on a downstream side of the refrigerant circulation path.

According to the 12th aspect of the present invention, the electric drive system for a vehicle according to the 11th aspect may further comprise: a flow path switching unit via which cooling medium is made to flow either into the electric motor or to bypass the electric motor, wherein: the flow path switching unit directs the cooling medium to bypass the electric motor when a higher priority is given to cooling the power converter.

According to the 13th aspect of the present invention, the electric drive system for a vehicle according to any one of the 1st through 12th aspects may further comprise: a control unit that controls cooling of the electric drive unit by controlling the refrigerant circulation unit and the air blower unit, wherein: the control unit controls the refrigerant circulation unit and the air blower unit so as to achieve a level of cooling performance corresponding to a drive force imparted by the electric drive unit to drive the vehicle.

According to the 14th aspect of the present invention, a vehicle has installed therein the electric drive system for a vehicle according to any one of the 1st through 13th aspects.

Advantageous Effect of the Invention

According to the present invention, the length of the refrigerant circulation path can be reduced while preventing communication of motor vibration to the body frame, thereby allowing the electric drive devices to be cooled with improved responsiveness.

BRIEF DESCRIPTION OF THE DRAWINGS (FIG. 1) A lateral sectional view of a front side of an electric vehicle with an electric drive system achieved in an embodiment installed therein (FIG. 2) A top view of the internal structure assumed on the front side of the electric vehicle shown in FIG. 1

(FIG. 3) A diagram indicating the cooling response pertaining to the electric drive system (FIG. 4) An illustration showing how outside air flows as it is guided into the outside heat exchanger provided in (a) and a view of the primary structural elements of the electric drive system achieved in the embodiment, i.e., the cooling apparatus and the drive components, taken from the front side of the vehicle, provided in (b)

(FIG. 5) An illustration showing how outside air flow as it is guided toward the outside heat exchanger (FIG. 6) The structure adopted in a cooling apparatus achieved as a variation of the embodiment (FIG. 7) A lateral sectional view of a rear side of a vehicle having installed at the rear axle thereof, an electric drive system equipped with a cooling apparatus configured with a liquid cooling system alone, provided in (a) and an illustration of drive components and essential parts of the cooling apparatus, provided in (b)

Figure 6:
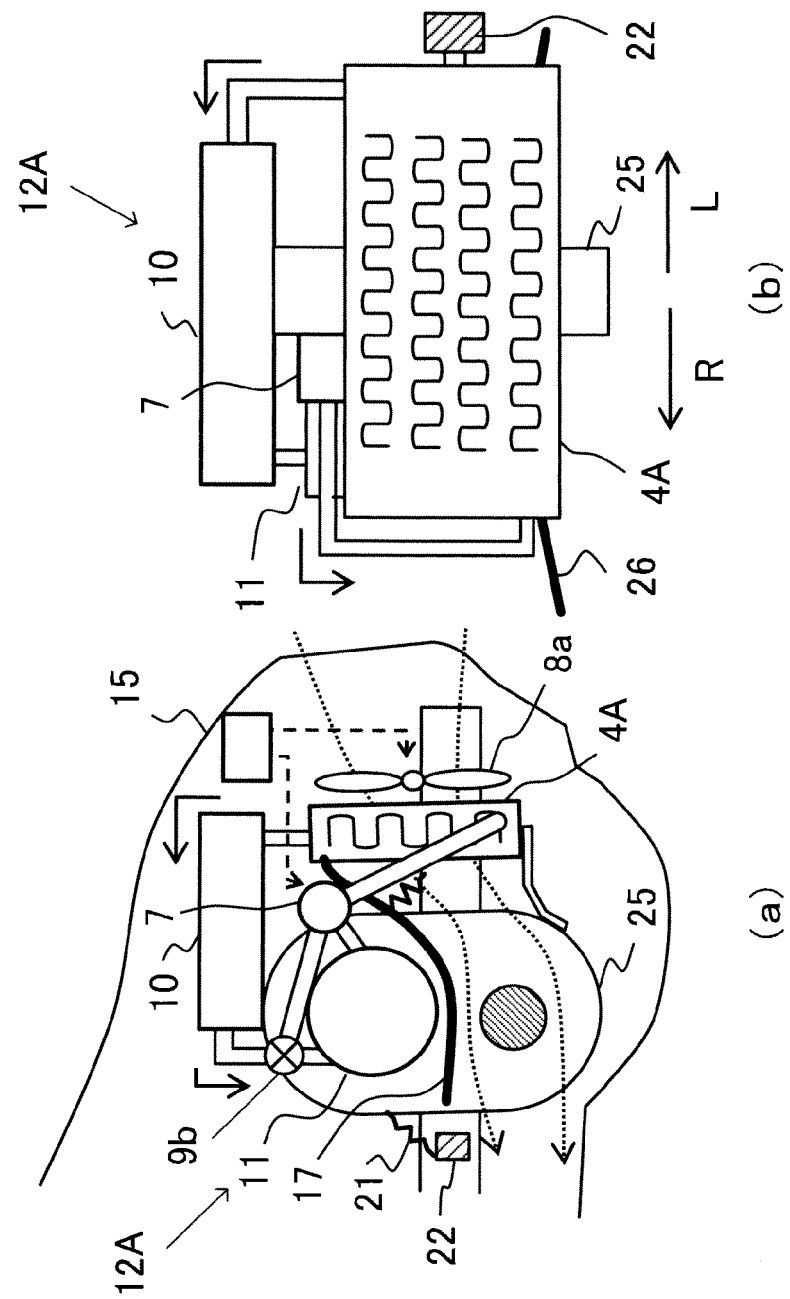

(FIG. 8) A view of a variation achieving miniaturization by shortening the cooling liquid piping in the electric drive system shown in FIG. 6 and creating a cooling liquid flow path within the system case (FIG. 9) An illustration of a structure achieved in a variation that allows an electricity storage device, as well as the power converter and the electric motor to be cooled with the cooling medium in the cooling apparatus.

Figure 2:
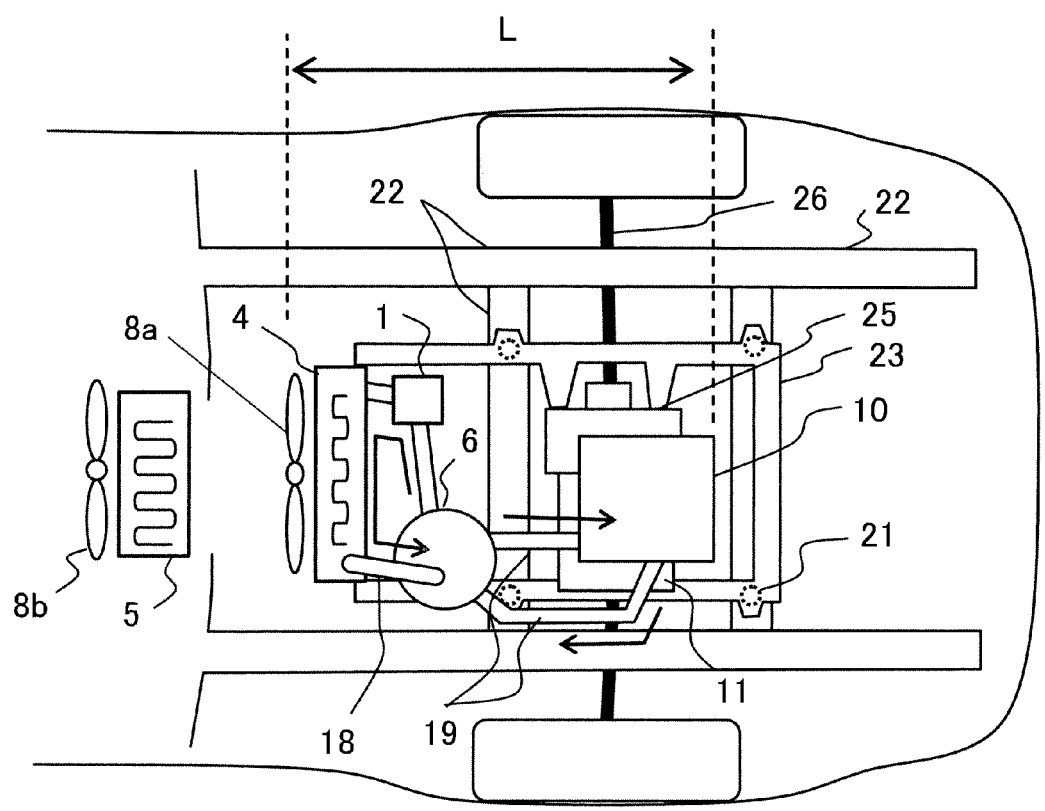

(FIG. 10) A diagram of the essential structure of the electric drive system shown in FIGS. 1 and 2, pertaining to its cooling apparatus and the cooling target power converter and electric motor (FIG. 11) A diagram indicating the torque characteristics relative to the rotation speed of an electric motor in the related art provided in (a), and a diagram indicating the torque characteristics relative to the rotation speed of the electric motor achieved in an embodiment provided in (b)

(FIG. 12) Various fan and pump engagement methods that may be adopted when engaging the fan and the pump in operation in a first cooling mode over a first operation range and in a second cooling mode over the second operation range (FIG. 13) A block diagram of the cooling mode selection control executed in the embodiment (FIG. 14) A flowchart of processing executed as a cooling mode selection control program achieved in the embodiment

DESCRIPTION OF EMBODIMENT

An embodiment of the present invention achieved by installing the electric drive system for a vehicle according to the present invention in an electric vehicle, is described. It is to be noted that the vehicular electric drive system according to the present invention may be adopted in a hybrid automobile, an electric train, a construction vehicle or the like, instead of in an electric automobile.

FIG. 1 is a lateral sectional view of the front side of an electric vehicle equipped with the electric drive system achieved in the embodiment. FIG. 2 is a top view of the internal structure assumed on the front side of the electric vehicle shown in FIG. 1. While the embodiment is described by assuming that the electric drive system is installed at the front of the electric vehicle, which is a front wheel drive vehicle, the electric drive system according to the present invention may instead be installed in a rear wheel drive electric vehicle or a four-wheel-drive electric vehicle. It is to be noted that in the description of the structures achieved as variations of the embodiment, given in reference to FIGS. 4 through 10, the same reference numerals are assigned to components similar to those shown in FIGS. 1 and 2 so as to preclude the necessity for a repeated explanation thereof.

The electric drive system achieved in the embodiment includes an electricity storage device (battery) 14 where power to be used to drive the electric vehicle in traveling operation is stored, a power converter 10 that drives an electric motor 11 by supplying power from the electricity storage device 14 to the electric motor 11, the electric motor 11 that generates a traveling drive force as it is driven by the power converter 10, a speed reducer 25 that amplifies the torque at the electric motor 11, a drive shaft 26 that transmits the torque output from the speed reducer 25 to the wheels, a cooling apparatus 12 that cools the power converter 10 and the electric motor 11, and a controller 15 that controls a target torque for the electric motor 11 and an operating state of the cooling apparatus 12 in correspondence to a state of driver operation and conditions at the cooling apparatus 12. It is to be noted that the power converter 10, the electric motor 11 and the speed reducer 25 will be specifically referred to as drive components of the electric drive system in the following description.

The cooling apparatus 12 includes a refrigerating cycle system and a liquid cooling system. The refrigerating cycle system is configured with the compressor 1, an outside heat exchanger (radiator) 4, a pressure reducer (expansion valve) 3, a middle heat exchanger 6 and a refrigerant piping 18. A fan 8a is mounted at the outside heat exchanger 4 and the flow rate of cooling air can be controlled via the controller 15. The outside heat exchanger 4 is a condenser that condenses the cooling medium having been compressed at the compressor 1 by releasing its heat to the outside, whereas the pressure reducer 3 is an expansion valve via which the pressure of the cooling medium having been condensed at the outside heat exchanger 4 is lowered. In addition, the middle heat exchanger 6 is an evaporator that absorbs heat from the cooling medium in a refrigerant circulation piping 19 by evaporating the cooling medium having passed through the pressure reducer (expansion valve) 3.

The liquid cooling system is configured with a pump 7, and inside heat exchanger 5, a flow-regulating plate 16, three-way valves 9a and 9b, the middle heat exchanger 6 and the cooling liquid piping 19. A fan 8b is installed at the inside heat exchanger 5 and the flow rate of cooling air can be controlled via the controller 15. It is to be noted that, although not shown, temperature sensors that measure the temperatures of the drive components and the cooling medium, are installed in the cooling apparatus 12. The controller 15 detects the operating states of various components as well as the temperatures of the drive components and the cooling medium, and controls the refrigerant temperatures in the refrigerating cycle system and the liquid cooling system by controlling the compressor 1, the fans 8a and 8b, the pump 7 and the three-way valves 9a and 9b.

In the refrigerating cycle system, the refrigerant is cooled through a refrigerating cycle, which includes the compressor 1 as its motive power source, as the refrigerant, optimal for the refrigerating cycle, such as a Freon alternative, circulates through a refrigerant piping 18 on a path formed with the compressor 1→the outside heat exchanger 4→the pressure reducer (expansion valve) 3→the middle heat exchanger 6 →the compressor 1. The liquid cooling system cools the drive components such as the power converter 10 and the electric motor 11, as a cooling liquid such as antifreeze, traveling through the cooling liquid piping 19, circulates in a path formed with the middle heat exchanger 6→the three-way valve 9a→the power converter 10→the three-way valve 9b→the electric motor 11→the pump 7→the middle heat exchanger 6. In addition, the liquid cooling system cools or heats the air inside the cabin with refrigerant, which also circulates through a path formed with the three-way valve 9a →The inside heat exchanger 5→the power converter 10. The cooling liquid flowing through the cooling liquid piping 19 in the liquid cooling cycle is cooled as it undergoes heat exchange at the middle heat exchanger 6 to exchange heat with the cooling medium flowing through the refrigerant piping 18 in the refrigerating cycle system. The air in the cabin is conditioned as the fan 8b blows air into the cabin through the inside heat exchanger 5.

The controller 15 adjusts the temperature of the cooling medium in the refrigerating cycle system and the temperature of the cooling liquid in the liquid cooling system by controlling the operating states of the compressor 1, the fans 8a and 8b, the pump 7 and the three-way valves 9a and 9b in the cooling apparatus 12. For instance, when the power converter 10 and the electric motor 11 have been operating under a large load and the temperatures of the drive components have risen or are expected to rise, the controller 15 lowers the temperatures of the cooling medium and the cooling liquid by increasing the drive output of the cooling apparatus 12. Under normal circumstances, the power converter 10 has a smaller heat content compared to the electric motor 11 and thus, the temperature of the power converter 10 rises faster as the drive load increases. In other words, the power converter 10 requires a lower cooling liquid temperature and better cooling response compared to the electric motor 11. Accordingly, the power converter 10 is disposed on the upstream side and the electric motor 11 is disposed on the downstream side in the cooling liquid piping 19, through which the cooling liquid flows, so as to ensure that the cooling liquid, having flowed out of the middle heat exchanger 6 first flows into the power converter 10 and then flows into the electric motor 11.

In order to prevent transmission of vibration or displacement attributable to the drive torque at the electric motor 11 to the vehicle skeleton (body frame) 22, the electric motor 11 is rigidly fastened to the sub-frame 23 instead of the body frame 22, and the sub-frame 23 is mounted at the vehicle skeleton 22 via an elastic support members (rubber mounts) 21. In addition to the electric motor 11 and the power converter 10, the components of the cooling apparatus 12, such as the compressor 1, the pressure reducer (expansion valve) 3, the outside heat exchanger 4, the fan 8a, the pump 7, the three-way valves 9a and 9b and the middle heat exchanger 6, are rigidly mounted at the sub-frame 23. Namely, the electric motor 11 and the power converter 10 are configured as integrated parts of the cooling apparatus 12 and the integrated unit is mounted at the vehicle skeleton 22 via the elastic support members (rubber mounts) 21. The components of the cooling apparatus 12 and the cooling targets, i.e., the power converter 10 and the electric motor 11, are connected to each other via the refrigerant piping 18 and the cooling liquid piping 19. It is to be noted that the refrigerant piping 18 or the cooling liquid piping 19 may be omitted by adopting an integrated structure for some components. For instance, by installing the power converter 10 and the electric motor 11 in a common housing, a flow passage formed within the housing can be used as an alternative to the cooling liquid piping 19, and in such a case, the length of the flow passage can be further reduced.

As explained earlier, when the outside heat exchanger (radiator) 4 of the vehicle is installed in the vicinity of the bumper located at the front of the vehicle, any relative displacement of the electric motor 11 and the body frame (body skeleton) 22, attributable to the drive torque at the electric motor 11, will have to be absorbed with elastic piping, such as a rubber hose, used to connect the drive components such as the power converter 10 and the electric motor 11, with the outside heat exchanger 4. The length of the elastic piping extending between the drive components, i.e., the power converter 10, the electric motor 11 and the like, and the outside heat exchanger 4 located at the front of the vehicle is bound to be significant. As a result, it will take some time before the cooling medium, having been cooled at the outside heat exchanger 4 in the refrigerating cycle system reaches the middle heat exchanger 6 where the cooling medium cools the cooling liquid in the liquid cooling system and the cooling liquid, with its temperature lowered at the middle heat exchanger 6 then reaches the power converter 10 and the electric motor 11.

In the embodiment, the power converter 10, the electric motor 11 and the cooling apparatus 12 are installed on the sub-frame 23, which is elastically supported at the body skeleton 22. This arrangement eliminates the need for taking into consideration any displacement of the electric motor 11 relative to the body skeleton 22 occurring due to drive torque at the electric motor 11, which, in turn, makes it possible to reduce the length of the refrigerant piping 18 and the cooling liquid piping 19 (or to do without either piping altogether). As a result, the cooling medium, having been cooled at the outside heat exchanger 4, is allowed to reach the power converter 10 and the electric motor 11 quickly. Furthermore, since the reduction in the piping length leads to reductions in volume and the heat content in both the cooling medium and the cooling liquid, the temperatures of the cooling medium and the cooling liquid can be adjusted more quickly. Ultimately, better cooling response can be assured for the electric drive system.

In the embodiment described above, the electric drive components, i.e., the power converter 10 and the electric motor 11, and the cooling apparatus 12 are configured as an integrated system on the sub-frame 23 and the integrated unit is then attached to the body skeleton 22 via the elastic support members 21. As an alternative, an integrated system constituted with the electric drive components, i.e., the power converter 10 and the electric motor 11, and the cooling apparatus 12, which cools the electric drive components, may instead be attached to the speed reducer 25 and then be mounted at the body skeleton 22 via the elastic support members 21. Namely, the present invention is in no way limited to the particular installation method described in reference to the embodiment, as long as the refrigerant piping length is reduced by configuring an integrated system with the cooling apparatus 12 and the electric drive components and the integrated system configured with the cooling apparatus 12 and the electric drive components is mounted at the body skeleton 22 via the elastic support members 21 so as to prevent transmission of electric motor vibration to the body skeleton 22, instead of connecting the cooling apparatus 12 with its cooling targets, i.e., the electric drive components such as the power converter 10 and the electric motor 11, via a long refrigerant piping, e.g., a rubber hose, as in the related art.

In addition, the middle heat exchanger 6 is disposed between the outside heat exchanger 4 and the power converter 10 in the embodiment. In more specific terms, the middle heat exchanger 6 is disposed within a range L defining the longest distance by which the outside heat exchanger 4 and the power converter 10 are set apart from each other, as shown in FIG. 1. In other words, the middle heat exchanger 6 is disposed at the position at which the lengths of the refrigerant piping 18 and the cooling liquid piping 19 are at their smallest within the range L between the outside heat exchanger 4 and a cooling target (the power converter 10 in this instance). As long as the overall piping length over the range L is minimized, the whole middle heat exchanger 6 does not need to be contained within the range L but instead it may be only partially set within the range L. This positional arrangement makes it possible to reduce the length of piping extending from the outside heat exchanger 6 to the power converter 10 and thus to force feed the cooling medium, having been cooled at the outside heat exchanger 4 and the middle heat exchanger 6, to the power converter 10 and the electric motor 11 quickly. As a result, an improvement in the cooling response is achieved at the electric drive system.

Furthermore, the embodiment adopts a positional arrangement whereby the refrigerant outlet port through which the refrigerant, having been cooled at the outside heat exchanger 4 is let out, is set closer to the refrigerant intake port at the middle heat exchanger 6 compared to a refrigerant intake port of the outside heat exchanger 4. Thus, the cooling medium having been cooled at the outside heat exchanger 4 is allowed to reach the refrigerant intake port of the middle heat exchanger 6 within a shorter length of time compared to the length of time it would take for the cooling medium let out through a refrigerant outlet port of the outside heat exchanger 4 formed further away from the refrigerant intake port of the middle heat exchanger 6 to reach the refrigerant intake port of the middle heat exchanger 6. As a result, better cooling response is assured for the electric drive system.

Likewise, a cooling liquid outlet port through which the cooling liquid, having been cooled at the middle heat exchanger 6, is let out, is set at a position closer to a cooling liquid intake port of the power converter 10 compared to a cooling liquid intake port of the middle heat exchanger 6. This positional arrangement allows the cooling liquid having been cooled at the middle heat exchanger 6 to reach the power converter 10 in a shorter length of time compared to the length of time it would take for cooling liquid let out through a cooling liquid outlet port of the middle heat exchanger 6 formed at a position further away from the cooling liquid intake port of the power converter 10, to reach the power converter 10. Consequently, better cooling response is achieved for the electric drive system.

Moreover, the outside heat exchanger 4 is disposed further toward the rear of the vehicle compared to an electric drive component (the power converter 10 or the electric motor 11) relative to the direction in which the vehicle advances (to the right on the drawing sheet on which FIG. 1 is presented). Thus, the exhaust heat released from the outside heat exchanger 4 while the drive components are being cooled can be guided into the cabin, as indicated by the dotted-line arrow in FIG. 1 via the movable baffle plate 16 set at the position indicated by the solid lines in FIG. 1. When the cooling liquid temperature is controlled at a relatively low level in order to enhance the electric drive component cooling performance in particular, the cabin heating function normally fulfilled by the inside heat exchanger 5 can be taken over by the outside heat exchanger 4 or the cabin heating function of the inside heat exchanger 5 may be taken over or assisted by the outside heat exchanger 4.

Next, the operations of the cooling apparatus 12 achieved in the embodiment are described. While an air cooling operation is in progress, the cooling medium in the refrigerant piping 18 is compressed at the compressor 1 and becomes a high-temperature, high-pressure gas, which then flows along the direction indicated by the arrow in FIG. 1, is condensed at the outside heat exchanger 4 as it releases heat into the air at the outside heat exchanger 4, and thus assumes the form of a high-pressure liquid. Subsequently, the cooling medium is depressurized at the pressure reducer 3 and becomes a two-layer refrigerant constituted with a low-pressure, low-temperature liquid and a gas. The two layer refrigerant then undergoes heat exchange at the middle heat exchanger 6 so as to exchange heat with the cooling liquid distributed through the cooling liquid piping 19. The controller 15 adjusts the temperature and the flow rate of the cooling medium in the refrigerant piping 18 by controlling the drive condition of the compressor 1.

While the air cooling operation is in progress, the cooling liquid in the cooling liquid piping 18 is force fed via the pump 7 and is cooled at the middle heat exchanger 6, where it exchanges heat with the cooling medium in the refrigerant piping 18. Part of the cooling liquid is guided via the three-way valve 9a to the inside heat exchanger 5 where it is used to cool the air inside the cabin before it flows back into the cooling liquid piping 19. The cooling liquid, having flowed out of the middle heat exchanger 6 and circulated through the inside heat exchanger 5, is then guided to the power converter 10 and the electric motor 11. It is to be noted that when the flow path to the inside heat exchanger 5 is cut off via the three-way valve 9a, the cooling liquid having flowed out of the middle heat exchanger 6 is directly delivered to the power converter 10 and the electric motor 11. As the cooling liquid absorbs the heat of the power converter 10 and the electric motor 11, its temperature rises and the heated cooling liquid travels back to the middle heat exchanger 6 via the pump 7. The controller 15 adjusts the temperature and the flow rate of the cooling liquid in the cooling liquid piping 19 by controlling drive of the pump 7 and the fan 8a and also switching flow paths via the three-way valves 9a and 9b.

For instance, if the temperature at the power converter 10 or the electric motor 11 is likely to rise quickly or the temperature at the power converter 10 or the electric motor 11 already exceeds an allowable range, the controller 15 cuts off the flow of cooling liquid to the inside heat exchanger 5 via the three-way valve 9a so as to allow the cooling liquid to flow directly into the power converter 10. In other words, the controller 15 avoids an increase in the temperature of the cooling liquid at the inside heat exchanger 5 and, at the same time, shortens the flow path from the middle heat exchanger 6 to the power converter 10. Consequently, the temperature of the cooling liquid to flow into the power converter 10 or the electric motor 11 can be lowered quickly, thereby assuring better cooling response for the electric drive system.

As long as the temperature of the power converter 10 is within the allowable range, the controller 15 directs the cooling liquid flowing out of the power converter 10 so that it flows into the electric motor 11 via the three-way valve 9b to cool the electric motor 11. However, if the temperature of the power converter 10 is beyond the allowable range or if the temperature is likely to rise quickly, the controller 15 switches flow paths via the three-way valve 9b so as to cut off the flow of cooling liquid into the electric motor 11 and direct the cooling liquid back to the pump 7. Namely, when a higher priority is set for cooling the power converter 10 rather than the electric motor 11, the controller 15 forms a cooling liquid flow bypassing the electric motor 11 by switching the three-way valve 9b. Once the load on the power converter 10 is reduced, the controller 15 executes control on the three-way valve 9b so as to allow the cooling liquid to flow to the electric motor 11 as well. Through these measures, flexible cooling control, factoring in the varying heat capacities of the individual cooling targets, is achieved and a cooling target with a low heat content can be cooled with better response by temporarily suspending cooling of the electric motor 11, the temperature of which rises relatively slowly, and rapidly suppressing any temperature increase at the power converter 10, the temperature of which tends to rise relatively quickly.

In addition, when the cooling liquid temperature needs to be lowered and, at the same time, the cabin temperature needs to be raised, the controller 15 ensures that the cooling liquid does not circulate through the inside heat exchanger 5 by controlling the three-way valve 9a. At the same time, the controller 15 sets the movable flow-regulating plate 16 at the position indicated by the solid line in FIG. 1 so as to guide the exhaust heat released from the outside heat exchanger 4 into the cabin. With the outside heat exchanger 4 configuring an integrated system together with the power converter 10 and the electric motor 11 as described above, the distance between the outside heat exchanger 4 and the inner space within the cabin is reduced and thus, the air inside the cabin can be heated with the exhaust heat from the outside heat exchanger 4 even when the cooling liquid temperature is low.

Figure 3:
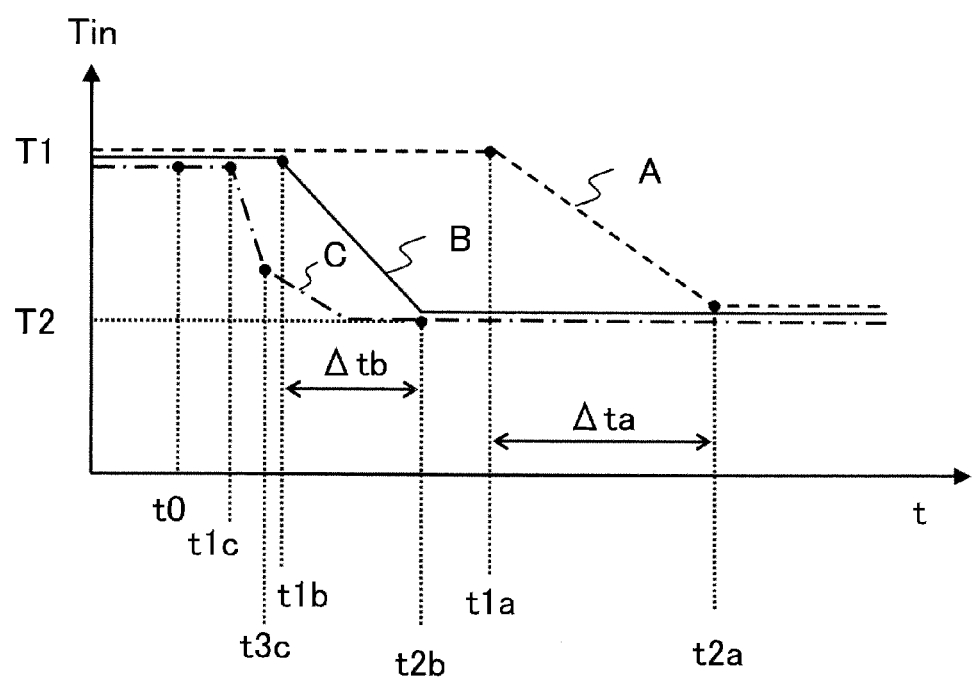
Figure 4:
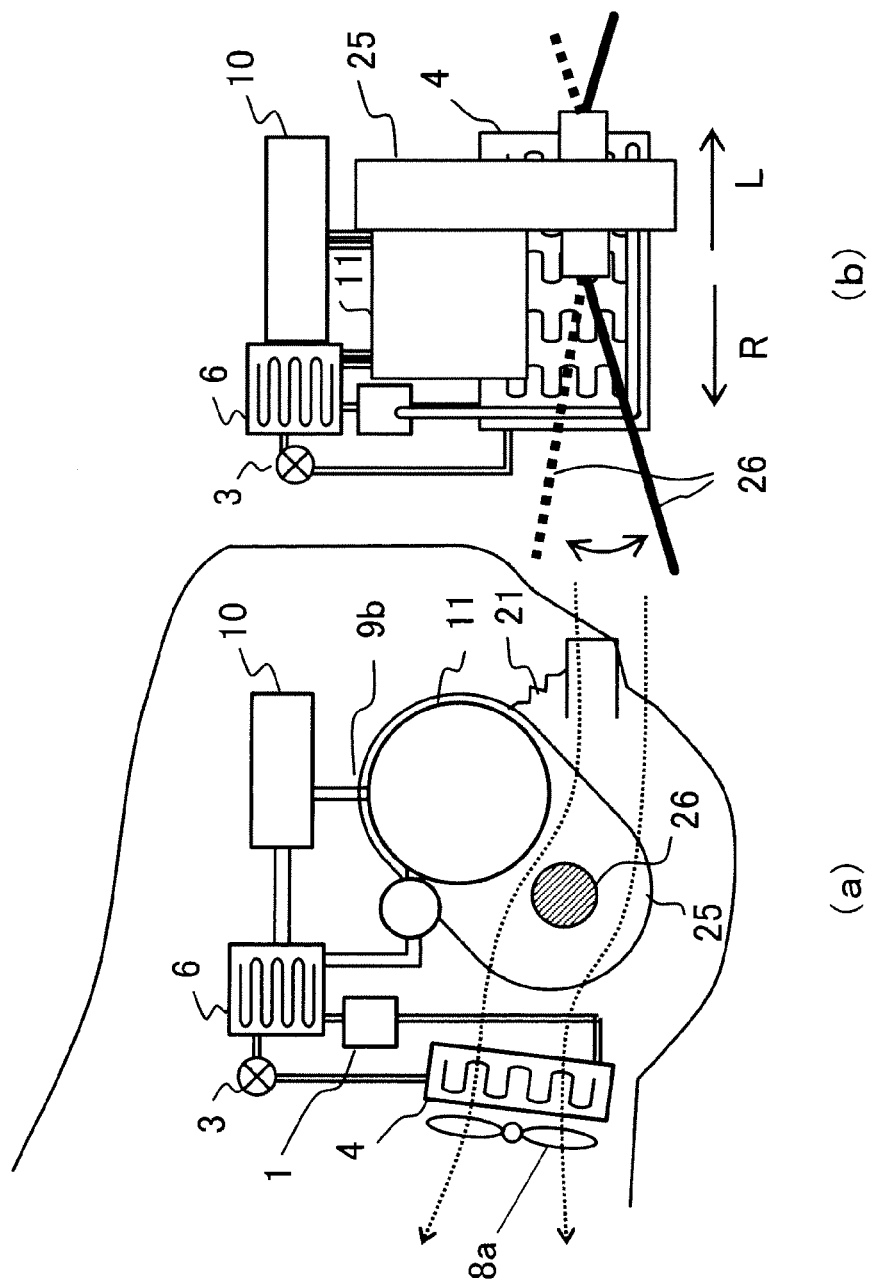

The cooling response of the electric drive system achieved in the embodiment is explained in reference to FIG. 3, indicating the time response of a cooling liquid intake temperature Tin at the cooling liquid intake port of the power converter 10. The cooling liquid intake temperature Tin is initially at T1. Then, in order to keep the temperature at the power converter 10 down, the controller 15 starts control at a time point t0 so as to lower the intake temperature Tin to T2.

In order to enable comparison of the cooling apparatus 12 in the electric drive system achieved in the embodiment with a standard cooling apparatus in the related art, the temperature response of an electric drive system with an outside heat exchanger (corresponding to the outside heat exchanger 4 in the embodiment) installed at the front end of the vehicle is indicated by the dotted line A in FIG. 3. The dotted line A indicates that after cooling control starts at the time point t0 so as to lower the cooling liquid intake temperature Tin at the power converter 10 to T2, the intake temperature Tin at the power converter 10 does not start to fall until a time point t1a. Then, the intake temperature Tin is actually decreased to T2 at a time point t2a after a length of time Ata elapses following the time point t1a.

The temperature response achieved with the cooling apparatus 12 in the electric drive system in the embodiment is indicated by the solid line B in FIG. 3. As explained earlier, the cooling apparatus 12 and the cooling targets, i.e., the power converter 10 and the electric motor 11, are configured as an integrated unit in the electric drive system achieved in the embodiment, resulting in a reduction in the lengths of the refrigerant piping 18 and the cooling liquid piping 19. Assuming that the controller 15 starts cooling control at the time point t0 so as to lower the cooling liquid intake temperature Tin at the power converter 10 to T2, the intake temperature Tin at the power converter 10 starts to fall at the time point t1b. Then, the intake temperature Tin goes down to T2 at a time point t2b after a length of time Δtb elapses following the time point t1b. In comparison to the temperature response of the cooling apparatus in the related art represented by the dotted line A, the intake temperature Tin starts to fall sooner by an extent matching the extent to which the lengths of the refrigerant piping 18 and the cooling liquid piping 19 are reduced. In addition, as the piping lengths are reduced, the volume and the heat contents of the cooling medium and the cooling liquid, too, are reduced, resulting in the intake temperature Tin falling to T2 within the length of time Δtb, shorter than the length of time Δta indicated by the dotted line A. which it takes for the temperature to drop to T2 in the related art.

The cooling apparatus 12 for the electric drive system achieved in the embodiment as described above is capable of quickly starting to lower the temperature of the cooling liquid used to cool the power converter 10 or the electric motor 11 and also reaching the target temperature rapidly once the temperature starts to go down. As a result, it assures both outstanding cooling response and superior cooling performance.

Temperature response, which may manifest when the cooling liquid circulation to the inside heat exchanger 5 is cut off via the three-way valve 9a and the cooling liquid circulation to the electric motor 11 is cut off via the three-way valve 9b in the cooling apparatus 12 for the electric drive system achieved in the embodiment, is indicated by the one-point chain line C in FIG. 3. It is to be noted that the temperature response in this example is graphed by assuming that the cooling liquid circulation to the electric motor 11 is resumed at a time point t3c at which the drive load on the power converter 10 has been reduced to a sufficiently low level. In this case, with the cooling liquid flow path shortened by cutting off the flow path to the inside heat exchanger 5, the intake temperature Tin at the power converter 10 starts to fall at a time point t1c, sooner than the corresponding time point indicated by the solid line B. In addition, since the volume and the heat content of the cooling liquid are also reduced with the flow paths to the inside heat exchanger 5 and the electric motor 11 cut off, the temperature changes more quickly once it starts going down. However, the temperature change rate begins to slow at the time point t3c, at which the cooling liquid supply to the electric motor 11 resumes.

By controlling the three-way valves 9a and 9b so as to reduce the cooling liquid flow path length and thus reduce the cooling liquid volume and the cooling liquid heat content as described above, the temperature of the cooling liquid used to cool the power converter 10 or the electric motor 11 can be lowered quickly, thereby achieving a further improvement in the cooling response of the electric drive system.

FIG. 4(a) illustrates the flow of outside air guided into the outside heat exchanger 4. In addition, FIG. 4(b) is a view of the primary structural elements of the electric drive system achieved in the embodiment, i.e., the cooling apparatus 12 and the drive components, taken from the front side of the vehicle. In the electric drive system achieved in the embodiment, the distances between the cooling apparatus 12 and the drive components such as the power converter 10, the electric motor 11 and the speed reducer 25 are shortened by reducing the lengths of the refrigerant piping 18 and the cooling liquid piping 19. This means that the extent of pressure loss occurring as the outside air is guided into the outside heat exchanger 4 tends to be more significant compared to the extent of pressure loss occurring at an outside heat exchanger 4 disposed at the front end of the vehicle.

The speed reducer 25 of the electric drive system and the wheels are connected via the drive shaft 26. In order to tolerate movement of the suspension (not shown), a space where the drive shaft 26 is allowed to move along the up/down direction, as shown in FIG. 4(b), is secured. Accordingly, the outside heat exchanger 4 is disposed so as to allow the cooling air to pass over both the upper side and the lower side of the drive shaft 26 at the same time. The outside heat exchanger 4 is disposed so as to ensure specifically that the cooling air passes over both the upper side and the lower side of the drive shaft 26 at the same time, even as the fan 8a at the outside heat exchanger 4 is rotationally driven while the vehicle is in a stationary state, in which outside air is not likely to flow readily toward the outside heat exchanger 4. Through these measures, the extent of cooling air pressure loss can be reduced, even in conjunction with the integrated system configured with the cooling apparatus 12, the power converter 10 and the electric motor 11 in order to shorten the distances between the components of the cooling apparatus 12 and the drive components, i.e., the power converter 10, the electric motor 11 and the speed reducer 25. As a result, an electric drive system assuring excellent drive efficiency and superior cooling response is achieved.

In the embodiment shown in FIG. 4(b), the electric motor 11 and the speed reducer 25 are disposed to the left and to the right relative to each other in an asymmetrical arrangement, further to the front relative to the outside heat exchanger 4. In the example presented in FIG. 4(b), the extent of pressure loss is less significant over the area of the outside heat exchanger 4 located on the right side of the vehicle (the R side in the figure) where cooling air is allowed to flow through a wider space. This means that the cooling air passing through the outside heat exchanger 4 is distributed in greater quantity over a greater range on the R side, rather than on the L side in the figure. In other words, the outside heat exchanger 4 demonstrates a higher level of cooling capability on the R side.

Accordingly, the outside heat exchanger 4 is designed to include a cooling medium outlet port located on the R side, where a higher level of cooling capability is achieved. The cooling medium outlet port is connected to the middle heat exchanger 6 via the refrigerant piping 18. As a result, the refrigerant-cooling effect of the fan 8a is enhanced and the cooling medium while still at low temperature is allowed to reach the middle heat exchanger 6. In addition, while the difference between the temperature of the cooling medium and the temperature of the cooling air is less significant on the outlet side of the outside heat exchanger 4, a relatively high air flow rate is assured in the vicinity of the outlet port, which, in turn, assures a good cooling effect around the outlet port. Namely, when the cooling performance of the outside heat exchanger 4 is not uniformly distributed, the cooling medium outlet port should be formed around an area where the level of cooling performance is relatively high and should be connected to the middle heat exchanger 6. Through these measures, the cooling response of the electric drive system can be further improved.

Figure 5:
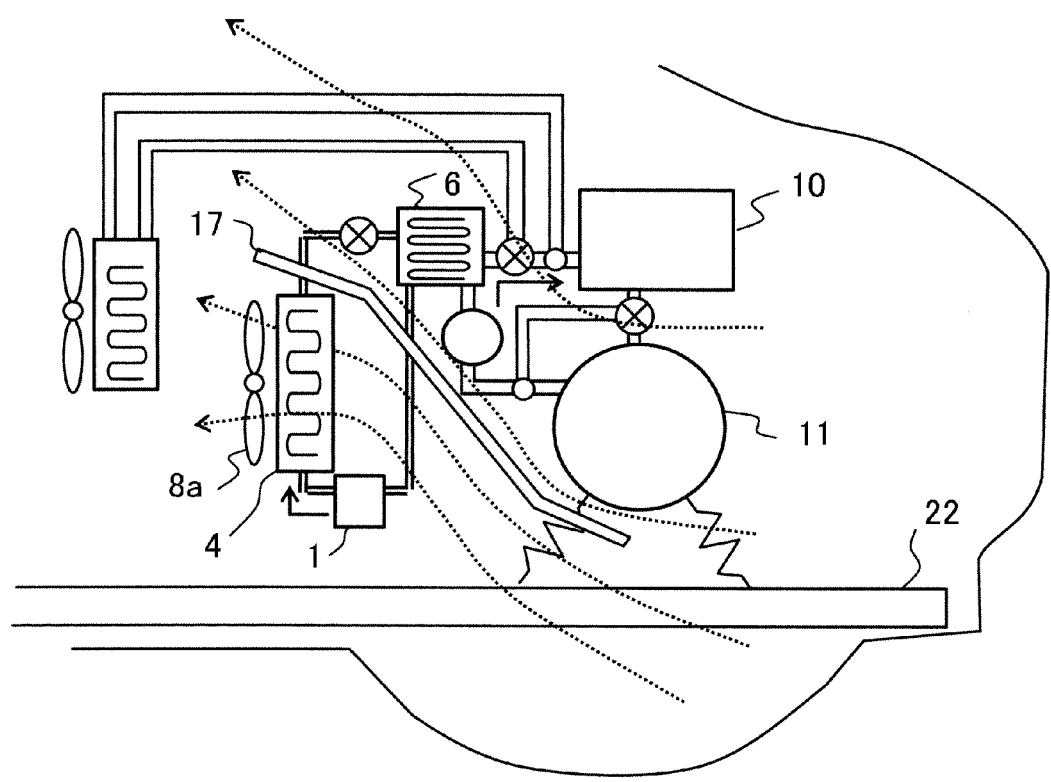

FIG. 5 shows the flow of outside air guided to the outside heat exchanger 4. The electric drive system achieved in the embodiment allows heat radiated from the surfaces of the drive components, such as the power converter 10, the electric motor 11 and the speed reducer 25, to flow into the outside heat exchanger 4 more readily by reducing the distances between the cooling apparatus 12 and the drive components. Since this is likely to lead to a lesser difference between the temperature of the cooling medium and the temperature of the cooling air, the cooling performance of the outside heat exchanger 4 may be adversely affected. As a means for addressing this concern, a flow-regulating plate 17 is installed so as to isolate outside air coming into contact with the drive component surfaces from outside air guided into the outside heat exchanger 4. The presence of the flow-regulating plate 17 keeps down the temperature of the cooling air guided into the outside heat exchanger 4 and thus improves the cooling efficiency of the electric drive system even though the distances between the drive components and the outside heat exchanger 4 are small.

FIG. 6 shows the structure of a cooling apparatus 12A achieved as a variation of the embodiment. The cooling apparatus 12A in the variation does not include a refrigerating cycle system but instead includes a liquid cooling system alone installed therein. FIG. 6(a) is a lateral sectional view of the front side of a vehicle, showing the positional arrangement with which the drive components and the cooling apparatus 12A are disposed, whereas FIG. 6(b) shows the drive components and an essential part of the cooling apparatus 12A in a view taken from the front side of the vehicle. In the cooling apparatus 12A achieved in the variation, cooling liquid force fed via the pump 7 is cooled as it passes through an outside heat exchanger 4A and the cooled liquid is then guided toward the power converter 10. The cooling liquid, having cooled the power converter 10, is then guided toward the electric motor 11 to cool the electric motor 11. The cooling liquid, having been used to cool the electric motor 11, travels back to the pump 7. In this cooling apparatus 12A, the outside heat exchanger 4A fulfills a function equivalent to that of the entire refrigerating cycle system explained earlier and the heat of the cooling medium (the cooling liquid in this instance) is released into the atmosphere via the outside heat exchanger 4A. The speed reducer 25 is supported at the body skeleton 22 via an elastic support member (rubber mount) 21, whereas the outside heat exchanger 4A, the pump 7, the power converter 10, the electric motor 11 and the like are locked onto the speed reducer 25.

Another component such as the electric motor 11 is not present at the air guiding surface of the outside heat exchanger 4A and the outside heat exchanger 4A is connected to the power converter 10 on its L side (located on the left side of the vehicle) where the pressure loss is less significant. The cooling liquid outlet port of this outside heat exchanger 4A is positioned closer to the power converter 10, compared to the cooling liquid intake port of the outside air heat exchanger 4A. In addition, a flow-regulating plate 17 is installed so as to disallow transfer of heat radiated from the outside heat exchanger 4A toward the drive component surfaces. The cooling air from the outside heat exchanger 4A is force fed toward the rear of the vehicle via both the upper side and the lower side of the drive shaft 26. The controller 15 adjusts the temperature of the cooling liquid by controlling the drive of the pump 7 and the fan 8a and the switching flow paths via the three-way valve 9b.

As does the cooling apparatus for the electric drive system achieved in the embodiment (see FIGS. 1 through 5) equipped with the refrigerating cycle system explained earlier, the cooling apparatus 12A in the variation succeeds in reducing the length of time to elapse before the cooling liquid temperature starts to fall by reducing the cooling liquid volume and the cooling liquid heat content. In other words, the cooling response and the cooling efficiency can also be improved for an electric drive system equipped with a liquid cooling system alone.

FIG. 7(a) is a lateral sectional view of the rear part of a vehicle equipped with an electric drive system with the cooling apparatus 12A configured with the liquid cooling system alone installed at the rear axle of the vehicle, whereas FIG. 7(b) shows the drive components and an essential part of the cooling apparatus 12A. An electric drive system with the cooling apparatus 12A constituted with a liquid cooling system alone may be installed at the rear axle, instead of at the front axle, as shown in FIG. 6, to achieve similar advantages, as long as the electric drive system adopts a structure similar to that shown in FIG. 6.

Figure 8:
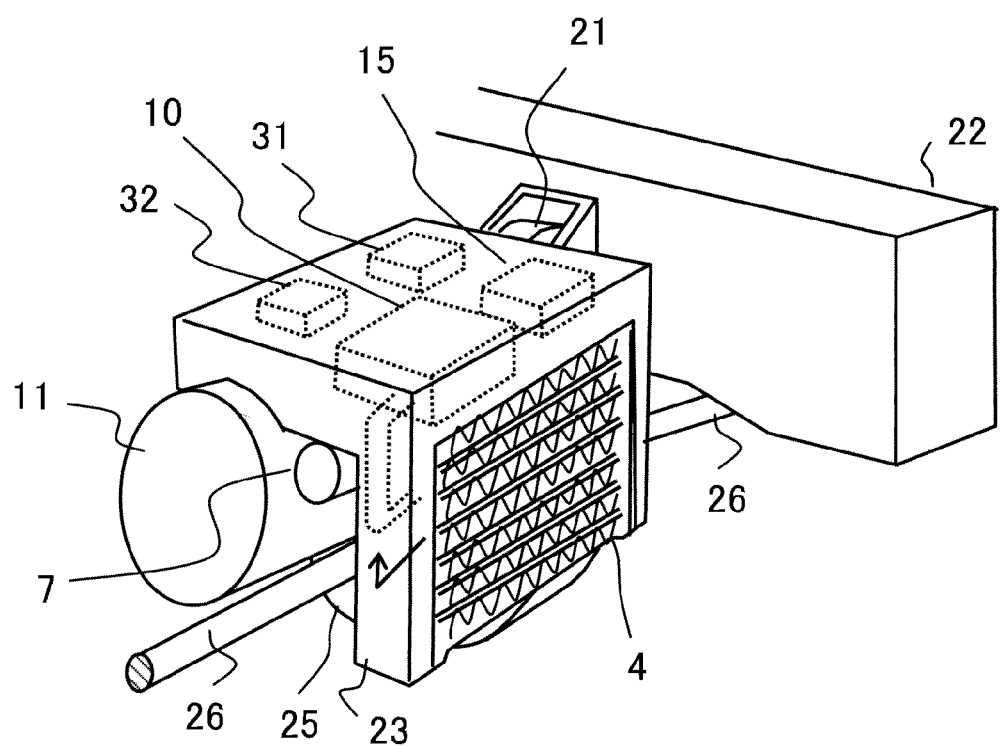

FIG. 8 presents an example of a variation achieving miniaturization by reducing the length of the cooling liquid piping in the electric drive system shown in FIG. 6 and instead creating a cooling liquid flow path inside a system casing. The cooling liquid, having flowed out of the outside heat exchanger 4, may be guided to the power converter 10 through such a casing. In addition, the variation shown in FIG. 8 includes a charger 31, which provides power from a power source located outside the vehicle to the electricity storage device 14, and a converter 32, which converts high-voltage power stored in the battery to low-voltage power to be provided to vehicle accessories, both mounted in the same casing. While the charger 31 and the converter 32 generate heat as they are driven, it is possible to dispense with piping by circulating cooling liquid near the drive circuits and thus, an electric drive system assuring outstanding cooling response can be achieved while minimizing the length of the piping.

Figure 9:
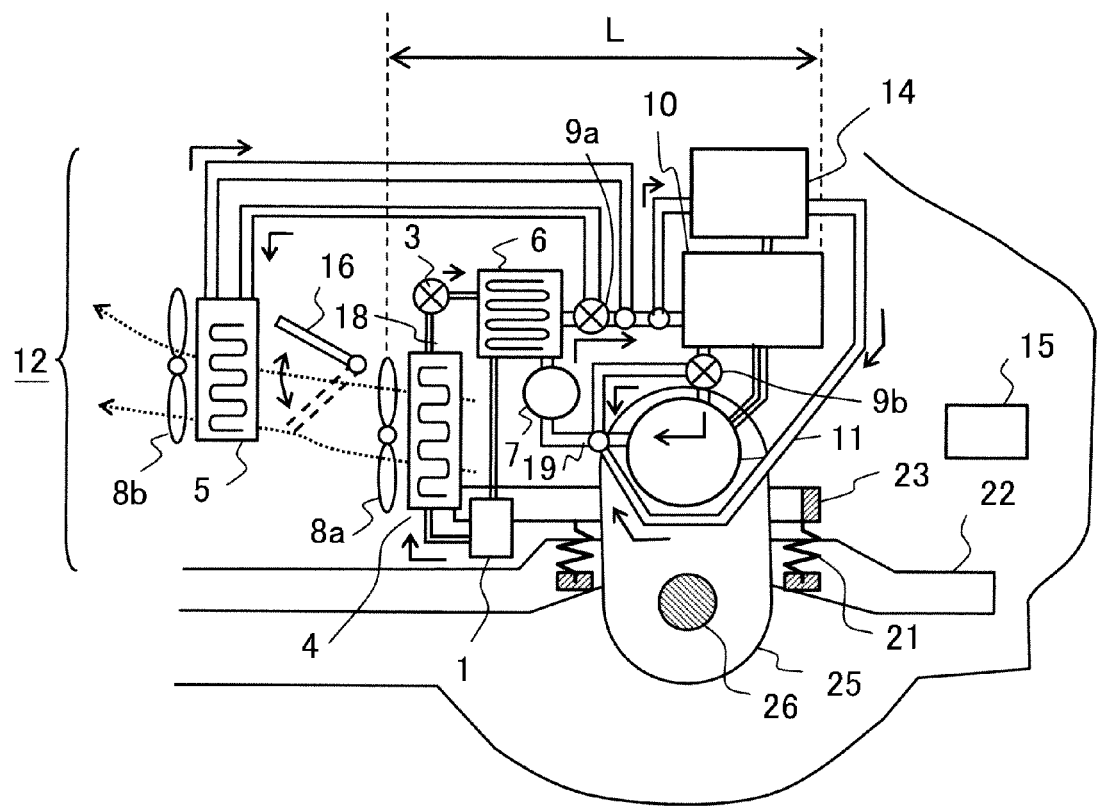

FIG. 9 shows the structure adopted in a variation in which the cooling medium at the cooling apparatus 12 is used to cool the electricity storage device 14 as well as the power converter 10 and the electric motor 11. This structure includes a cooling liquid piping 19 through which the cooling medium (the cooling liquid in this instance) output from the middle heat exchanger 6 flows to the power converter 10 and the electricity storage device 14 in a parallel pattern. It is to be noted that since the temperature of the cooling medium used to cool the electricity storage device 14 is normally lower than the temperature of the cooling medium used to cool the power converter 10 or the electric motor 11, the electricity storage device 14 may instead be cooled with the cooling medium in the refrigerating cycle system.

Figure 10:
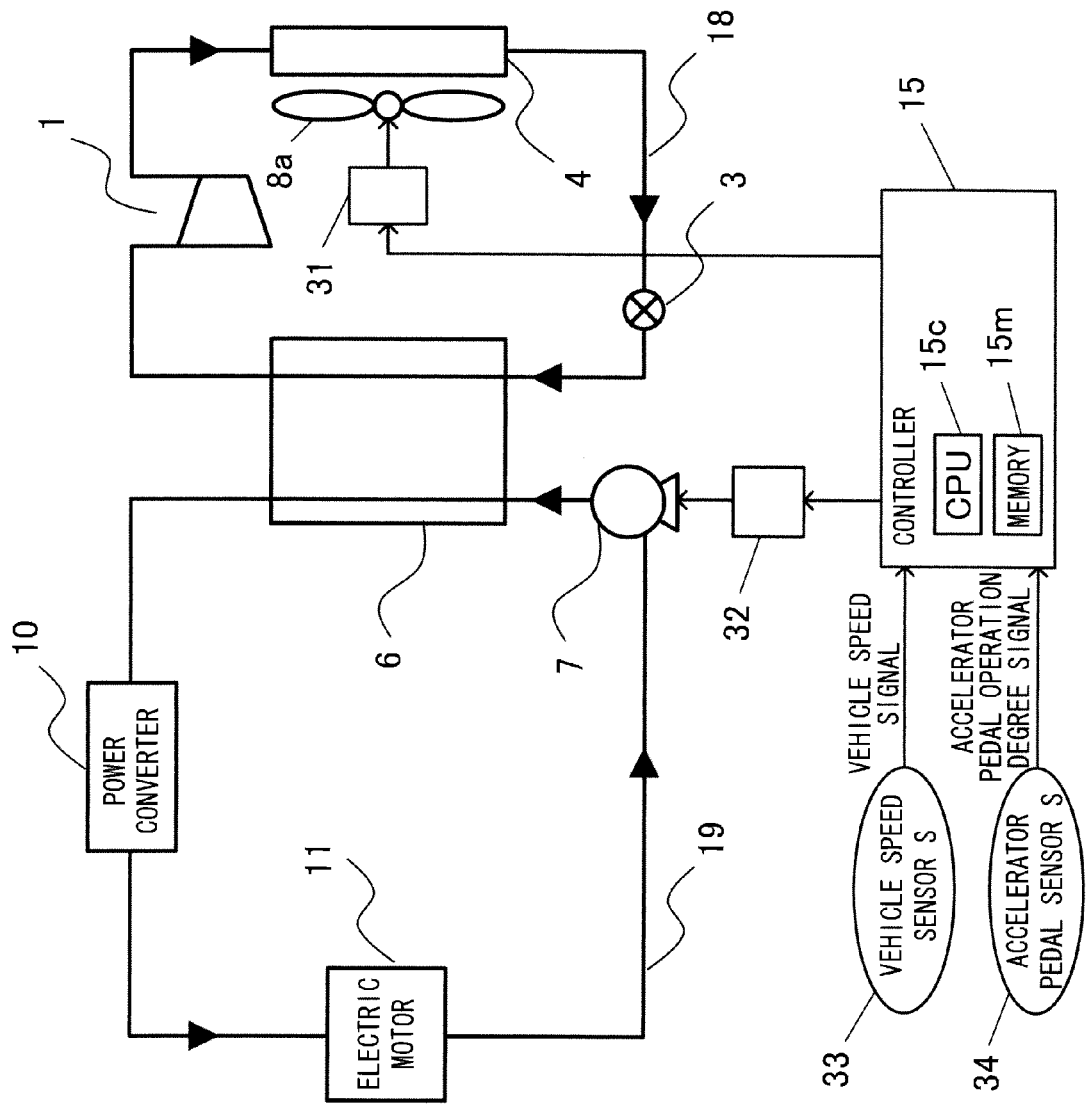

Next, the operations of the cooling apparatus 12 in the electric drive system shown in FIGS. 1 and 2 are described. FIG. 10 shows the essential structure of the electric drive system shown in FIG. 1 and FIG. 2, pertaining to the cooling apparatus 12 and its cooling targets, the power converter 10 and the electric motor 11. It is to be noted that the three-way valves 9a and 9b, the inside heat exchanger 5 and the fan 8b in FIGS. 1 and 2 are not included in the illustration provided in FIG. 10 and that the following explanation focuses on the operations of the main components of the cooling apparatus 12.

The controller 15, constituted with a CPU 15c, a memory 15m and the like, controls a fan drive device 31 and a pump drive device 32 by executing a cooling control program to be described in detail later, so as to control cooling of the power converter 10 and the electric motor 11. A vehicle speed sensor 33, which detects the traveling speed of the electric vehicle, an accelerator pedal sensor 34, which detects the degree of accelerator pedal operation at the electric vehicle and the like are connected to the controller 15.

Figure 7:
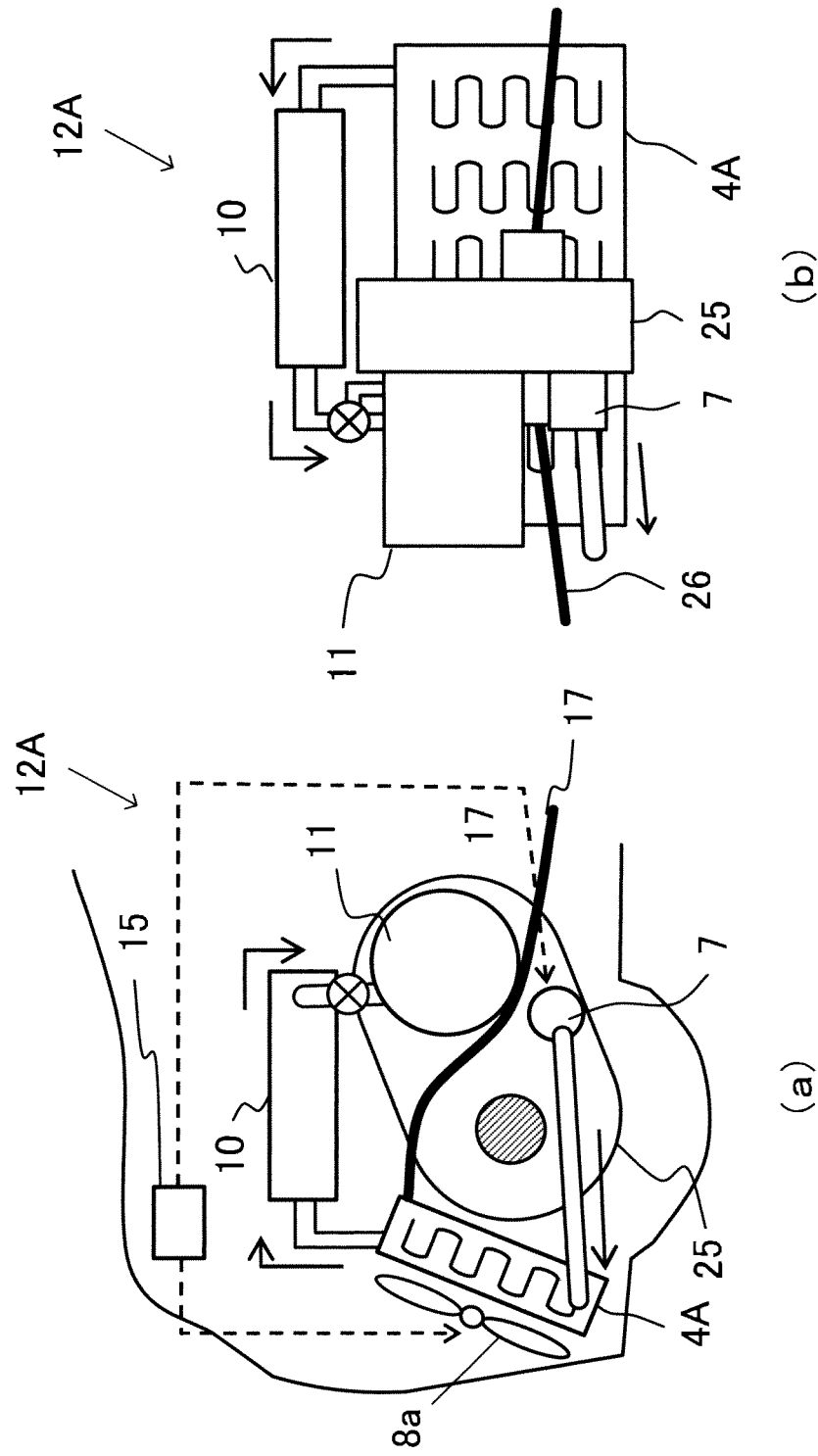

It is to be noted that a function equivalent to that of the outside heat exchanger 4A shown in FIGS. 6 and 7 in the alternative electric drive system equipped with the liquid cooling system alone, i.e., the function of releasing the heat of the cooling medium in the refrigerant piping 19 into the atmosphere can be fulfilled with the compressor 1, the outside heat exchanger 4, the pressure reducer (expansion valve) 3, the middle heat exchanger 6 and the refrigerant piping 18 in FIG. 10.

A method that may be adopted when designing the physical limits (sizes and dimensions) of the traveling drive motor 11 and the power converter 10 achieved in the embodiment to be installed in an electric vehicle, is now explained. Generally speaking, the physical bulk of an electric motor or a power converter has a correlation to the maximum torque, the maximum output and the cooling performance level therefore required. For instance, once the physical bulk of the electric motor and the corresponding required cooling performance are determined, the quantity of heat generated at the electric motor, at which the temperature of the electric motor can be held so as not to exceed an upper limit, can be determined and the maximum torque and the maximum output of the electric motor, which cause heat to be generated in this specific quantity, too, can be determined. Furthermore, once the physical bulk, the maximum torque and the maximum output of the electric motor are determined, the cooling performance required to sustain the temperature of the electric motor at or less than the upper limit can be determined. Furthermore, the physical bulk of an electric motor or a power converter is in proportion to the maximum torque and the maximum output. This means that the maximum torque and the maximum output of a physically large motor or power converter will be greater.

As explained earlier, the physical bulk of an electric motor or a power converter is designed in the related art based upon the maximum torque and the maximum output required when starting the vehicle, accelerating the vehicle, driving the vehicle uphill or the like. However, the torque and the output actually required in the vehicle under typical driving conditions are well below maximum torque and output, and maximum torque and maximum output are actually used only occasionally and briefly during regular traveling operation. In the related art, an electric motor and a power converter designed to assume large physical bulk based upon the maximum torque and maximum output that are required only occasionally and for short periods of time, are installed in a vehicle, even though the vehicle only requires a torque and output far less than the maximum torque and maximum output during regular steady traveling operation. This embodiment enables optimal cooling of the electric motor and the power converter so as to reduce the overall physical bulk of the electric motor and the power converter while assuring the required maximum torque and maximum output.

FIG. 11(a) indicates torque characteristics of an electric motor in the related art that may manifest relative to the rotation speed, whereas FIG. 11(b) indicates the torque characteristics of the electric motor 11 achieved in the embodiment of the present invention relative to the rotation speed. It is assumed that each electric motor is engaged in operation under constant torque control, whereby the torque is controlled so as to not exceed the maximum torque over a low rotation speed range and is engaged in operation under constant output control, whereby the output is controlled so as not to exceed the maximum output (i.e., the torque is reduced as the rotation speed rises) over a high rotation speed range. The torque characteristics in FIG. 11(a) were determined in conjunction with an electric motor and a power converter in the related art, the physical bulks of which were calculated based upon the maximum torque and the maximum output required for startup, acceleration, hill climbing and the like.

The embodiment is distinguishable in that the operation range of the electric motor 11 and the power converter 10, which is determined in correspondence to the rotation speed and the torque at the electric motor 11, is divided into a first operation range and a second operation range, as indicated in FIG. 11(b). In the first operation range, the electric motor 11 and the power converter 10 are engaged in operation with a torque and an output corresponding to a lower load when, for instance, the vehicle travels over flat terrain at a substantially uniform speed in a steady traveling operation, compared to a load under which they are engaged in operation while the vehicle starts up, accelerates or travels uphill. In the second operation range, the electric motor 11 and the power converter 10 are engaged in operation with a torque and an output corresponding to a heavier load when the vehicle is starting up, accelerating or traveling uphill, and requires greater torque and greater output compared to those required for a steady traveling operation.

The torque represented by a second torque line and the output represented by a second output line, both indicated by the dotted line defining the second operation range in FIG. 11(b) are equal to or greater than the maximum torque represented by the maximum torque line and the maximum output represented by the maximum output line pertaining to the electric motor in the related art in FIG. 11(a). In addition, the boundary separating the first operation range from the second operation range, indicated by the solid line, forms a first torque line representing a torque lower than the torque represented by the second torque line in the second operation range and a first output line representing an output lower than the output represented by the second output line in the second operation range.

In addition, the level of cooling performance of the cooling apparatus 12, at which the electric motor 11 and the power converter 10 are cooled, is varied from the first operation range to the second operation range in this embodiment. Namely, the cooling apparatus 12 cools the electric motor 11 and the power converter 10 at a higher cooling performance level over the second operation range in which greater torque and greater output are generated, compared to the cooling performance level in the first operation range. In the first operation range, the controller 15 controls the drive of the fan 8a and the pump 7 so as to enable the cooling apparatus 12 to demonstrate a cooling performance level that does not allow the temperatures at the electric motor 11 and the power converter 10 to exceed the respective temperature limits while the electric motor 11 and the power converter 10 are engaged in operation so as to continuously generate torque and output in the range defined by the first torque line and the first output line indicated by the solid line in FIG. 11(b). In this description, a cooling mode selected to cool the electric motor 11 and the power converter 10 over the first operation range will hereafter be referred to as a first cooling mode.

In the second operation range, the controller 15 controls the drive of the fan 8a and the pump 7 so as to enable the cooling apparatus 12 to demonstrate a cooling performance level that does not allow the temperatures at the electric motor 11 and the power converter 10 to exceed the respective temperature limits while the electric motor 11 and the power converter 10 are engaged in operation so as to briefly generate torque and output in the hatched range defined by the second torque line and the second output line indicated by the dotted line in FIG. 11(b). In this description, a cooling mode selected to cool the electric motor 11 and the power converter 10 over the second operation range will hereafter be referred to as a second cooling mode.

Torque and output in the first operation range, enclosed by the first torque line and the first output line, are not the large torque and output required for heavy load operations of the electric vehicle, such as startup. acceleration and hill climbing. Rather, the torque and output in the first operation range are those required for steady traveling operation of the vehicle traveling, for instance, over flat terrain at a substantially uniform speed, i.e., torque and output lower than the torque and output required for heavy load operations. In other words, they are typical torque and output that can be generated continuously. This means that the first torque line defines a continuous torque rating, whereas the first output line defines a continuous output rating.

Torque and output in the second operation range enclosed by the second torque line and the second output line, on the other hand, are those required for heavy load operations of the electric vehicle, such as startup, acceleration and hill climbing. The torque and output in the second operation range are greater than those required for steady traveling operation. In other words, the torque and output in the first operation range are those that can be generated on a short-term basis. This means that the second torque line defines a short-term torque rating and the second output line defines a short-term output rating.

The expression "short-term" used in this description refers to a typical length of time over which torque and output greater than those required for steady traveling operation need to be generated for a heavier-load operation of the electric vehicle as it starts up, accelerates or travels uphill. In addition, the temperature upper limit for the electric motor 11 is determined based upon the temperature tolerance of the material used to insulate the electric motor 11 or the like, whereas the temperature upper limit for the power converter 10 is determined based upon the temperature tolerance of the power conversion switching elements or the like.

FIG. 12 shows various methods (a) through (d) through which the fan 8a and the pump 7 may be engaged in operation in the first cooling mode over the first operation range and in the second cooling mode over the second operation range. In all the operation methods (a) through (d), the fan 8a and/or the pump 7 will be engaged in operation, so as to achieve a higher level of cooling performance in the second cooling mode over the cooling performance achieved for the first cooling mode. In the first cooling mode, drive of the fan 8a and the pump 7 are controlled so as to sustain the temperatures of the electric motor 11 and the power converter 10 at levels equal to or lower than the respective temperature upper limits while continuously generating lower torque and output for the steady traveling operation, as explained earlier. In the second cooling mode, drive of the fan 8a and the pump 7 is controlled so as to sustain the temperatures at the electric motor 11 and the power converter 10 at levels equal to or below the respective temperature upper limits while generating high torque and output required for heavier-load operation such as startup, acceleration or hill climbing, on a short-term basis.

In the operation method (a) in FIG. 12, the fan 8a and the pump 7 are each engaged in steady operation at a predetermined speed in the first cooling mode. In the second cooling mode, the fan 8a and the pump 7 are engaged either in maximum speed operation or they are engaged in operation so as to assure a level of cooling performance in proportion to the torque or the output generated at the electric motor 11. In operation method (b), the fan 8a and the pump 7 are each engaged in operation so as to achieve a level of cooling performance in proportion to the torque or output generated at the electric motor 11 in the first cooling mode. In the second cooling mode, the fan 8a and the pump 7 are each engaged in maximum speed operation.

In the operation method (c), the fan 8a and the pump 7 are operated differently. The fan 8a is engaged in steady operation at a predetermined speed in the first cooling mode. In the second cooling mode, the fan 8a is either engaged in maximum speed operation or engaged in operation so as to achieve a level of the cooling performance in proportion to the torque or the output generated at the electric motor 11. The pump 7, however, is engaged in steady operation at a predetermined speed both in the first cooling mode and in the second cooling mode. In the operation method (d), too, the fan 8a and the pump 7 are operated differently. The fan 8a is engaged in steady operation at a predetermined speed both in the first cooling mode and the second cooling mode. The pump 7, on the other hand, is engaged in steady operation at a predetermined speed in the first cooling mode and is either engaged in maximum speed operation or in operation so as to achieve a level of cooling performance in proportion to the torque or the output generated at the electric motor 11 in the second cooling mode.

The fan 8a and the pump 7 may be engaged in operation in the first cooling mode and the second cooling mode through a method other than the operation methods (a) through (d) described in reference to FIG. 12. Namely, they may be engaged in operation through any method, as long as a higher level of cooling performance is assured in the second cooling mode than in the first cooling mode. It is to be noted that when the fan 8a or the pump 7 is engaged in operation to achieve a cooling performance level in proportion to the torque or the output generated at the electric motor 11, better operational efficiency is achieved at the fan 8a and the pump 7 than that achieved in steady operation.

Figure 13:
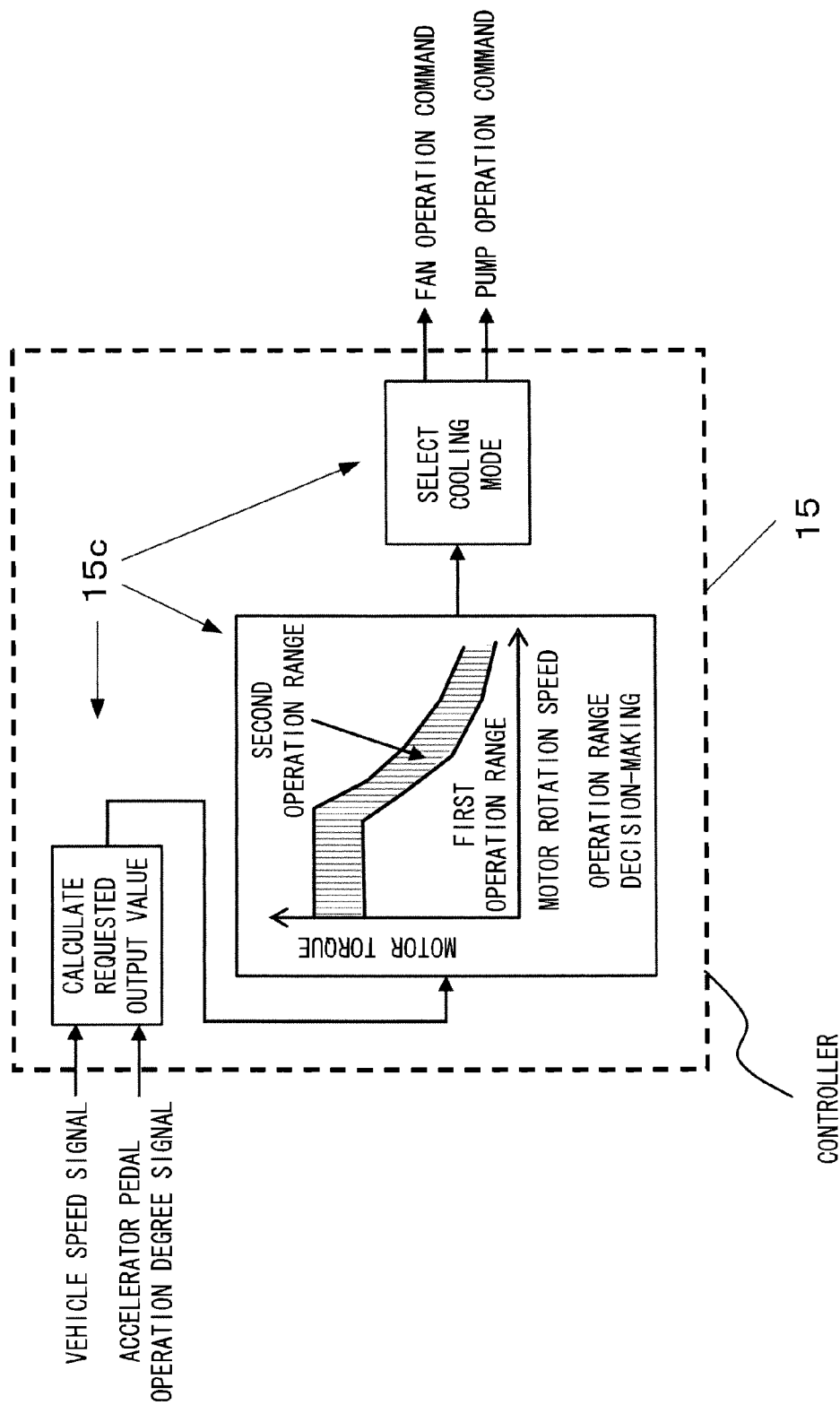
Figure 14:
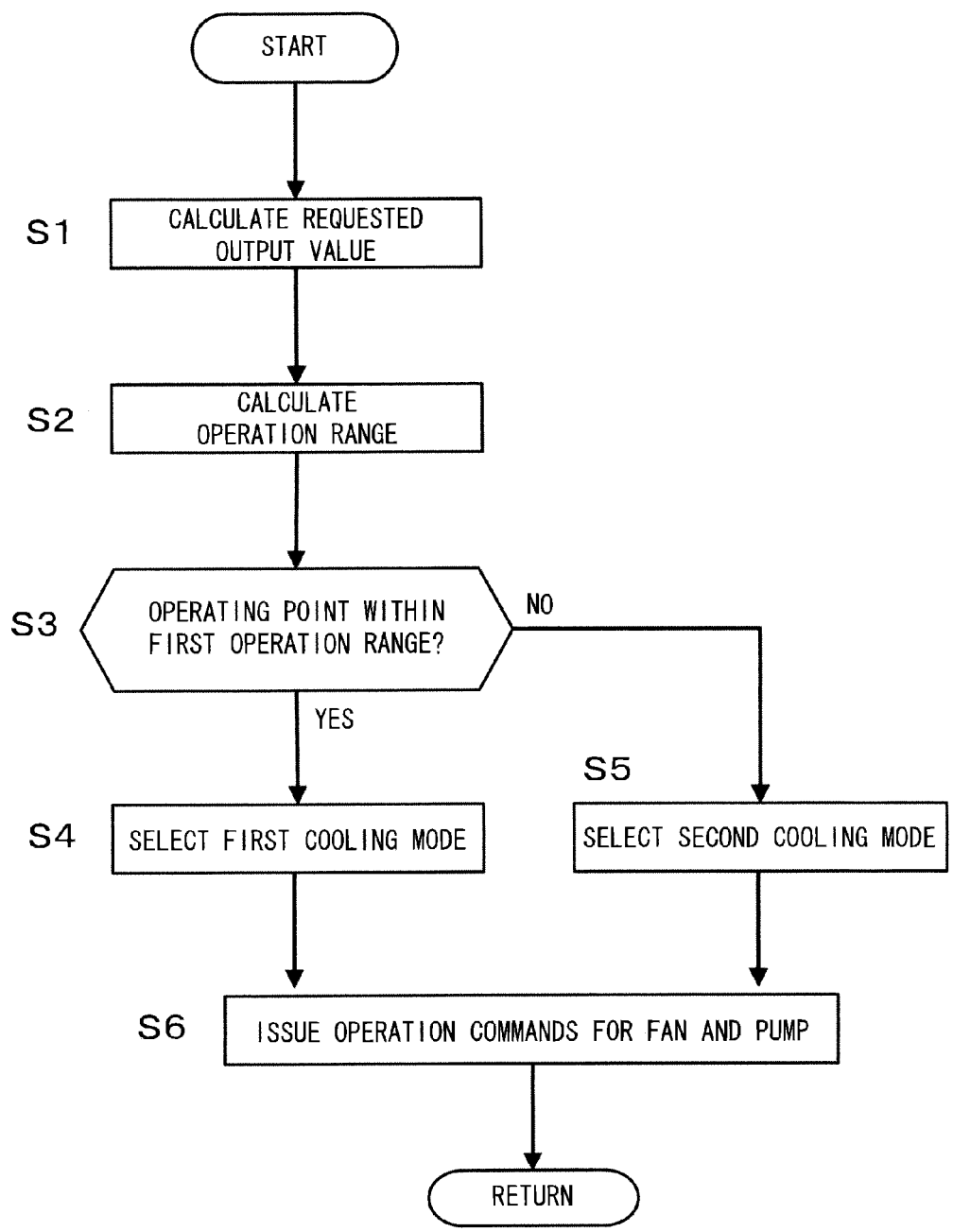

FIG. 13 is a block diagram pertaining to the cooling mode selection control executed in the embodiment and FIG. 14 presents a flowchart of processing executed based upon the cooling mode selection control program achieved in the embodiment. In reference to these figures, the cooling mode selection operation executed in the embodiment is described. The CPU 15c in the controller 15, which configures the cooling mode selection control block shown in FIG. 13 in the form of software at the microcomputer, repeatedly executes the cooling mode selection control program in FIG. 14 while the ignition key switch (not shown) remains on.

In step 1, the CPU 15c calculates an output request value for the electric motor 11 based upon a vehicle signal input thereto from the vehicle speed sensor 33 and an accelerator pedal operation degree signal input thereto from the accelerator pedal sensor 34. Since the degree of accelerator pedal operation is in proportion to a requested torque value at the electric vehicle, the CPU 15c multiplies the vehicle speed value by a value obtained by converting the accelerator operation degree to the requested torque value and thus calculates a requested drive force value for the electric vehicle, i.e., a requested output value for the electric motor 11.

In step 2, the CPU 15c makes a decision as to whether the operating point, which is determined by the torque and the rotation speed of the electric motor 11 corresponding to the requested torque value and the vehicle speed, is within the first operation range or within the second operation range. The CPU 15c first converts the requested torque value for the electric vehicle to a torque at the electric motor 11 based upon the gear ratio at the transmission (not shown), converts the vehicle speed to a rotation speed at the electric motor 11 based upon the gear ratio at the transmission, and then determines the operating point corresponding to the torque and the rotation speed at the electric motor 11. Next, the CPU 15c makes a decision with regard to whether the operating point for the electric motor 11 is within the first operation range or within the second operation range and then selects the cooling mode corresponding to the operation range indicated by the decision-making results.

If the operating point for the electric motor 11 is within the first operation range, the operation proceeds to step 4, in which the CPU 15c selects the first cooling mode. However, if the operating point for the electric motor 11 is within the second operation range, the operation proceeds to step 5, in which the CPU 15c selects the second cooling mode. In step 6, the CPU 15c outputs to the fan drive device 31 a first cooling mode operation command or a second cooling mode operation command for the fan 8a in correspondence to the selected cooling mode. In addition, the CPU 15c outputs to the pump drive device 32 to a first cooling mode operation command or a second cooling mode operation command for the pump 7.

The physical bulk of both the electric motor and the power converter for an electric vehicle in the related art, which are cooled at a uniformly high cooling performance level over a wide operation range enclosed by the maximum torque line and the maximum output line, as indicated in FIG. 11(a), are determined based upon the maximum torque defined by the maximum torque line and the maximum output defined by the maximum output line. For this reason, the electric motor and the power converter 4 in the electric vehicle in the related art each assume a greater physical bulk compared to that corresponding to the smaller torque and smaller output required for the steady traveling operation explained earlier. The embodiment is distinguishable in that the operation range of the electric motor 11 is divided into a first operation range, within which smaller torque and smaller output are generated for the steady traveling operation, and a second operation range in which greater torque and greater output are generated for a heavier-load operation such as a startup, acceleration or hill climbing. The cooling targets are cooled in the second operation range with higher cooling performance compared to the cooling performance level achieved in the first operation range. In other words, instead of determining the physical bulk of both the electric motor 11 and the power converter 10 based upon the second torque line and the second output line (see FIG. 11(*b*)) defining the second operation range, which are equivalent to the maximum torque line and the maximum output line in the related art (see FIG. 11(*a*)), the physical bulk of both the electric motor 11 and the power converter 10 are determined based upon the first torque line and the first output line defining the first operation range over which smaller torque and smaller output is required. Consequently, the physical bulks of both the electric motor 11 and the power converter 10 can be reduced over those in the related art.

Furthermore, the cooling apparatus 12 achieved in the embodiments allows the electric motor 11 to be engaged in operation over a high-efficiency operation range. The characteristics diagrams in FIG. 11 each indicating the torque characteristics relative to the rotation speed of a specific electric motor include iso-efficiency curves representing the electric motor operational efficiency. In the related art, the physical bulk of the electric motor is determined based upon the maximum torque line and the maximum output line, and for this reason, an operation range in which the electric motor is frequently engaged in operation for regular traveling (the range enclosed by the dotted line in FIG. 11(*a*)), i.e., the operating points corresponding to smaller torques and outputs for the steady traveling operation, is on the low efficiency side as indicated in FIG. 11(*a*). In contrast, the physical bulk of the electric motor 11 in the embodiment is determined based upon the first torque line and the first output line for the steady traveling operation, as indicated in FIG. 11(*b*). As a result, higher efficiency is assured in the operation range over which the electric motor 11 is frequently engaged in operation for regular traveling (the range enclosed by the dotted line in FIG. 11(*b*)), i.e., the operating points corresponding to smaller torques and outputs for steady traveling operation. Namely, the electric motor 11 in the embodiment can be engaged in operation with higher efficiency compared to the related art and, as a result, power consumption at the electric motor 11 can be reduced.

Moreover, the level of cooling performance achieved via the fan 8*a* and the pump 7 is raised in the embodiment only when the electric motor is engaged in operation over the second operation range requiring greater torque and greater output. With the level of cooling performance to be provided via the fan 8*a* and the pump 7 lowered when the electric motor is engaged in operation over the first operation range requiring smaller torque and smaller output for steady traveling operation the physical bulks of the fan 8*a*, the pump 7 and their drive devices 31 and 32 can be reduced. Furthermore, the power consumption at the fan 8*a*, the pump 7 and their drive devices 31 and 32 can be lowered.

While the embodiment and variations thereof have been described by assuming that the cooling apparatus 12 includes a liquid cooling system through which a cooling liquid used as a cooling medium circulates, the present invention is not limited to this example and may be adopted in conjunction with an oil cooling system through which oil used as a cooling medium, circulates. A cooling apparatus 12 configured with an oil cooling system will assure both a cooling function that allows the inside of the electric motor to be directly cooled and a lubricating function by taking advantage of the low electrical conductivity of the oil.

As described above, the cooling apparatus 12, the level of cooling performance thereof can be adjusted under electronic control, is elastically supported at the body skeleton 22 via the elastic support member 21, which also supports the power converter 10 and the electric motor 11. Thus, the overall length of piping disposed at the cooling apparatus 12 can be reduced and the volume and heat content of the cooling medium, too, can be reduced, thereby making it possible to provide an electric drive system assuring rapid cooling response.

As long as the features characterizing the present invention are not compromised, the present invention is not limited to the particulars of the embodiment and variations described above and other modes that are conceivable within the technical scope of the present invention are also within the scope of invention.

The following advantages are achieved through the embodiment and variations thereof herein described. Firstly, the electric drive components (the power converter 10 and the electric motor 11), which electrically drive the vehicle, and the cooling apparatus 12, which cools the electric drive components, included in the electric drive system for the vehicle, are configured as an integrated unit mounted at the body frame 22 of the vehicle via the elastic support member 21. This allows the length of the refrigerant circulation path to be reduced and thus improves the cooling response of the electric drive system while ensuring that motor vibration is not transmitted to the body frame 22.

In addition, the cooling apparatus 12 achieved in the embodiment or any variation thereof includes a refrigerant piping 19 through which the cooling medium is circulated to the electric drive components (the power converter 10 and the electric motor 11), heat exchange devices via which the cooling medium and outside air exchange heat (the middle heat exchanger 6, the compressor 1, the outside heat exchanger 4, the pressure reducer (expansion valve) 3 and the refrigerant piping 18 or the outside heat exchanger 4A), a pump 7 via which the cooling medium is circulated between the heat exchange devices and the electric drive components through the refrigerant piping 19 and a fan 8*a* that blows air to the heat exchange devices. The electric drive components, the refrigerant piping 19, the heat exchange devices, a pump 7 and the fan 8*a* are installed at a sub-frame 23 instead of the body frame 22, and the sub-frame 23, in turn, is mounted at the body frame 22 via the elastic support member 21. This allows the length of the refrigerant circulation path to be reduced and thus improves the cooling response of the electric drive system while ensuring that motor vibration is not transmitted to the body frame 22.

The disclosure of the following priority application is herein incorporated by reference:

Japanese Patent Application No. 2010-023917, filed Feb. 5, 2010

The invention claimed is:

1. An electric drive system for a vehicle, comprising:
an electric drive unit that electrically drives the vehicle; and
a cooling unit that cools the electric drive unit,
wherein the electric drive unit and the cooling unit are mounted at a body frame of the vehicle via an elastic support member, the electric drive unit and the cooling unit being configured as an integrated unit;
wherein the cooling unit includes:
a refrigerant circulation path through which a cooling medium is circulated to the electric drive unit;
a heat exchange unit via which the cooling medium and outside air exchange heat;
a refrigerant circulation unit that circulates the cooling medium between the heat exchange unit and the electric drive unit through the refrigerant circulation path; and
an air blower unit that blows air to the heat exchange unit, wherein the electric drive unit, the refrigerant circulation path, the heat exchange unit, the refrigerant circulation unit and the air blower unit are disposed at a sub-frame rather than at the body frame, and the sub-frame is mounted at the body frame via the elastic support member; and wherein a cooling medium outlet port through which the cooling medium is let out from the heat exchange unit is positioned closer to a cooling medium intake port of the electric drive unit, compared to a cooling medium intake port of the heat exchange unit.

2. An electric drive system for a vehicle according to claim 1, wherein: a cooling medium outlet port of the heat exchange unit is set in an area where the outside air passes through the heat exchange unit at a higher flow rate.

3. An electric drive system for a vehicle according to claim 1, further comprising:
a flow-regulating plate configured to prevent the outside air near the electric drive unit from passing through the heat exchange unit.

4. An electric drive system for a vehicle according to claim 1, further comprising:
an outside air delivery unit configured to deliver the outside air having passed through the heat exchange unit into a cabin of the vehicle.

5. An electric drive system for a vehicle according to claim 1, wherein:
the heat exchange unit is disposed so that the outside air blown toward the heat exchange unit by the air blower unit passes through both over an upper side and over a lower side of a driveshaft of the vehicle.

6. An electric drive system for a vehicle according to claim 1, wherein:
the heat exchange unit includes another refrigerant circulation path different from the refrigerant circulation path and is equipped with a compressor configured to compress the cooling medium into the other refrigerant circulation path, a condenser configured to condense the cooling medium having flowed out of the compressor by releasing heat thereof into an atmosphere, an expansion valve via which pressure of the cooling medium having flowed out of the condenser is lowered, and an evaporator configured to absorb heat from the cooling medium flowing through the refrigerant circulation path by evaporating the cooling medium having flowed out from the expansion valve.

7. An electric drive system for a vehicle according to claim 6, wherein:
a cooling medium outlet port through which cooling medium flows out of the condenser is positioned closer to a cooling medium intake port of the evaporator, compared to a cooling medium intake port of the condenser.

8. An electric drive system for a vehicle according to claim 6, wherein:
the evaporator is disposed at a position at which lengths of the refrigerant circulation path and the other refrigerant circulation path, extending between the condenser and the electric drive unit, are smallest.

9. An electric drive system for a vehicle according to claim 1, wherein:
the electric drive unit includes an electric motor configured to drive the vehicle to engage the vehicle in traveling operation and a power converter configured to drive the electric motor, with the power converter disposed on an upstream side of the refrigerant circulation path and the electric motor disposed on a downstream side of the refrigerant circulation path.

10. An electric drive system for a vehicle according to claim 9, further comprising:
a flow path switching unit via which cooling medium is made to flow either into the electric motor or to bypass the electric motor, wherein:
the flow path switching unit is configured to direct the cooling medium to bypass the electric motor when a higher priority is given to cooling the power converter.

11. An electric drive system for a vehicle according to claim 1, further comprising:
a control unit configured to control cooling of the electric drive unit by controlling the refrigerant circulation unit and the air blower unit, wherein:
the control unit is configured to control controls the refrigerant circulation unit and the air blower unit so as to achieve a level of cooling performance corresponding to a drive force imparted by the electric drive unit to drive the vehicle.

12. A vehicle having installed therein an electric drive system for a vehicle according to claim 1.

* * * * *